United States Patent
Qian et al.

(10) Patent No.: US 9,810,812 B2
(45) Date of Patent: Nov. 7, 2017

(54) METHOD FOR PRODUCING CONTACT LENSES WITH DURABLE LUBRICIOUS COATINGS THEREON

(71) Applicant: Novartis AG, Basel (CH)

(72) Inventors: Xinming Qian, Johns Creek, GA (US); Frank Chang, Cumming, GA (US); Yasuo Matsuzawa, Roswell, GA (US); Venkat Shankar, Suwanee, GA (US)

(73) Assignee: Novartis AG, Basel (CH)

(*) Notice: Subject to any disclaimer, the term of this patent is extended or adjusted under 35 U.S.C. 154(b) by 0 days.

(21) Appl. No.: 15/249,587

(22) Filed: Aug. 29, 2016

(65) Prior Publication Data

US 2017/0068019 A1  Mar. 9, 2017

Related U.S. Application Data

(60) Provisional application No. 62/214,240, filed on Sep. 4, 2015.

(51) Int. Cl.
| | |
|---|---|
| *G02C 7/00* | (2006.01) |
| *G02C 7/02* | (2006.01) |
| *G02C 7/04* | (2006.01) |
| *G02B 1/04* | (2006.01) |
| *C08J 7/12* | (2006.01) |
| *B29D 11/00* | (2006.01) |

(52) U.S. Cl.
CPC ........ *G02B 1/043* (2013.01); *B29D 11/00067* (2013.01); *B29D 11/00125* (2013.01); *C08J 7/123* (2013.01); *C08J 2383/08* (2013.01); *C08J 2433/02* (2013.01); *C08J 2471/00* (2013.01); *C08J 2477/00* (2013.01)

(58) Field of Classification Search
CPC ....... G02B 1/043; B29C 39/006; B29C 39/02; G02C 7/04; G02C 7/048; G02C 7/02
USPC ............. 351/159.33, 159.01, 159.02, 159.73
See application file for complete search history.

(56) References Cited

U.S. PATENT DOCUMENTS

| | | |
|---|---|---|
| 3,408,429 A | 10/1968 | Wichterle |
| 3,916,033 A | 10/1975 | Merrill |
| 3,996,187 A | 12/1976 | Travnicek |
| 3,996,189 A | 12/1976 | Travnicek |
| 4,136,250 A | 1/1979 | Mueller |
| 4,143,949 A | 3/1979 | Chen |
| 4,153,641 A | 5/1979 | Deichert |
| 4,182,822 A | 1/1980 | Chang |
| 4,189,546 A | 2/1980 | Deichert |
| 4,254,248 A | 3/1981 | Friends |
| 4,259,467 A | 3/1981 | Keogh |
| 4,260,725 A | 4/1981 | Keogh |
| 4,261,875 A | 4/1981 | LeBoeuf |
| 4,276,402 A | 6/1981 | Chromecek |
| 4,312,575 A | 1/1982 | Peyman |
| 4,327,203 A | 4/1982 | Deichert |
| 4,332,922 A | 6/1982 | Kossmehl |
| 4,341,889 A | 7/1982 | Deichert |
| 4,343,927 A | 8/1982 | Chang |
| 4,347,198 A | 8/1982 | Ohkada |
| 4,355,147 A | 10/1982 | Deichert |
| 4,444,711 A | 4/1984 | Schad |
| 4,460,534 A | 7/1984 | Boehm |
| 4,486,577 A | 12/1984 | Mueller |
| 4,510,094 A | 4/1985 | Drahnak |
| 4,530,879 A | 7/1985 | Drahnak |
| 4,543,398 A | 9/1985 | Bany |
| 4,605,712 A | 8/1986 | Mueller |
| 4,632,844 A | 12/1986 | Yanagihara |
| 4,661,575 A | 4/1987 | Tom |
| 4,684,538 A | 8/1987 | Klemarczyk |
| 4,703,097 A | 10/1987 | Wingler |
| 4,833,218 A | 5/1989 | Lee |
| 4,837,289 A | 6/1989 | Mueller |
| 4,916,169 A | 4/1990 | Boardman |
| 4,954,586 A | 9/1990 | Toyoshima |
| 4,954,587 A | 9/1990 | Mueller |
| 5,010,141 A | 4/1991 | Mueller |
| 5,034,461 A | 7/1991 | Lai |
| 5,039,761 A | 8/1991 | Ono |
| 5,070,170 A | 12/1991 | Robertson |
| 5,077,335 A | 12/1991 | Schwabe |
| 5,079,319 A | 1/1992 | Mueller |
| 5,145,886 A | 9/1992 | Oxman |

(Continued)

FOREIGN PATENT DOCUMENTS

| | | |
|---|---|---|
| EP | 332329 A1 | 1/1995 |
| WO | 2016/032940 A1 | 3/2016 |

OTHER PUBLICATIONS

Auciello et al., Plasma-Surface Interactions and Processing of Materials, The Application of Plasmas to Thin Film Deposition Processes, Kluwer Academic Publishers, 1990, pp. 377-399.

Barbier et al., Stable Modification of PDMS Surface Properties by Plasma Polymerization: Application to the Formation of Double Emulsions in Microfluidic Systems, American Chemical Society, Langmuir, vol. 22, No. 12, 2006, pp. 5230-5232.

Bhattacharya et al, Studies on Surface Wettability of Poly(Dimethyl) Siloxane (PDMS) and Glass Under Oxygen-Plasma Treatment and Correlation With Bond Strength, Journal of Microelectromechanical Systems, vol. 14, No. 3, 2005, pp. 590-597.

(Continued)

*Primary Examiner* — James Greece
(74) *Attorney, Agent, or Firm* — Jian Zhou

(57) ABSTRACT

The invention is related to a method for producing silicone hydrogel contact lenses with a stable lubricious hydrogel coating thereon. A method of the invention comprises forming a plasma-reactive hydrophilic polymer hybrid base coating having reactive functional groups on a silicone hydrogel contact lens and heating the silicone hydrogel contact lens with the hybrid base coating in an aqueous solution of a water-soluble and thermally crosslinkable hydrophilic polymeric material to form a stable lubricious hydrogel coating thereon.

20 Claims, No Drawings

(56) References Cited

U.S. PATENT DOCUMENTS

| | | |
|---|---|---|
| 5,346,946 A | 9/1994 | Yokoyama |
| 5,358,995 A | 10/1994 | Lai |
| 5,387,632 A | 2/1995 | Lai |
| 5,416,132 A | 5/1995 | Yokoyama |
| 5,451,617 A | 9/1995 | Lai |
| 5,464,667 A | 11/1995 | Kohler |
| 5,486,579 A | 1/1996 | Lai |
| 5,508,317 A | 4/1996 | Muller |
| 5,583,463 A | 12/1996 | Merritt |
| 5,760,100 A | 6/1998 | Nicolson |
| 5,789,464 A | 8/1998 | Muller |
| 5,843,346 A | 12/1998 | Morrill |
| 5,849,810 A | 12/1998 | Muller |
| 5,849,811 A | 12/1998 | Nicolson |
| 5,894,002 A | 4/1999 | Boneberger |
| 5,962,548 A | 10/1999 | Vanderlaan |
| 5,981,675 A | 11/1999 | Valint, Jr. |
| 6,039,913 A | 3/2000 | Hirt |
| 6,046,250 A | 4/2000 | Boardman |
| 6,099,122 A | 8/2000 | Chabrecek |
| 6,150,546 A | 11/2000 | Butts |
| 6,169,127 B1 | 1/2001 | Lohmann |
| 6,200,626 B1 | 3/2001 | Grobe, III |
| 6,213,604 B1 | 4/2001 | Valint, Jr. |
| 6,218,508 B1 | 4/2001 | Kragh |
| 6,376,569 B1 | 4/2002 | Oxman |
| 6,436,481 B1 | 8/2002 | Chabrecek |
| 6,440,571 B1 | 8/2002 | Valint, Jr. |
| 6,447,920 B1 | 9/2002 | Chabrecek |
| 6,451,871 B1 | 9/2002 | Winterton |
| 6,465,056 B1 | 10/2002 | Chabrecek |
| 6,500,481 B1 | 12/2002 | Vanderlaan |
| 6,521,352 B1 | 2/2003 | Chabrecek |
| 6,586,038 B1 | 7/2003 | Chabrecek |
| 6,623,747 B1 | 9/2003 | Chatelier |
| 6,627,124 B1 | 9/2003 | Herbrechtsmeier |
| 6,630,243 B2 | 10/2003 | Valint, Jr. |
| 6,719,929 B2 | 4/2004 | Winterton |
| 6,730,366 B2 | 5/2004 | Lohmann |
| 6,734,321 B2 | 5/2004 | Chabrecek |
| 6,762,264 B2 | 7/2004 | Kunzler |
| 6,793,973 B2 | 9/2004 | Winterton |
| 6,800,225 B1 | 10/2004 | Hagmann |
| 6,835,410 B2 | 12/2004 | Chabrecek |
| 6,851,805 B2 | 2/2005 | Blum |
| 6,878,399 B2 | 4/2005 | Chabrecek |
| 6,881,269 B2 | 4/2005 | Matsuzawa |
| 6,884,457 B2 | 4/2005 | Gilliard |
| 6,896,926 B2 | 5/2005 | Qiu |
| 6,923,978 B2 | 8/2005 | Chatelier |
| 6,926,965 B2 | 8/2005 | Qiu |
| 6,940,580 B2 | 9/2005 | Winterton |
| 7,078,074 B2 | 7/2006 | Matsuzawa |
| 7,297,725 B2 | 11/2007 | Winterton |
| 7,384,590 B2 | 6/2008 | Kelly |
| 7,387,759 B2 | 6/2008 | Kelly |
| 7,490,936 B2 | 2/2009 | Blum |
| 7,605,190 B2 | 10/2009 | Moszner |
| 7,915,323 B2 | 3/2011 | Awasthi |
| 8,154,804 B2 | 4/2012 | McGinn |
| 8,420,711 B2 | 4/2013 | Awasthi |
| 8,529,057 B2 * | 9/2013 | Qiu ................... G02B 1/043 351/159.33 |
| 9,010,933 B2 | 4/2015 | Matsuzawa |
| 2007/0122540 A1 | 5/2007 | Salamone |
| 2007/0229758 A1 | 10/2007 | Matsuzawa |
| 2008/0142038 A1 | 6/2008 | Kunzler |
| 2008/0152800 A1 | 6/2008 | Bothe |
| 2008/0174035 A1 | 7/2008 | Winterton |
| 2008/0226922 A1 | 9/2008 | Ferreiro |
| 2009/0145086 A1 | 6/2009 | Reynolds |
| 2009/0145091 A1 | 6/2009 | Connolly |
| 2009/0186229 A1 | 7/2009 | Muller |
| 2009/0212450 A1 | 8/2009 | Imafuku |
| 2012/0026457 A1 | 2/2012 | Qiu |
| 2012/0088843 A1 | 4/2012 | Chang |
| 2012/0088844 A1 | 4/2012 | Kuyu |
| 2012/0244088 A1 | 9/2012 | Saxena |
| 2012/0245249 A1 | 9/2012 | Saxena |
| 2014/0226124 A1 | 8/2014 | Matsuzawa |
| 2015/0166205 A1 | 6/2015 | Qiu |
| 2016/0061995 A1 | 3/2016 | Chang |

OTHER PUBLICATIONS

Dilsiz et al., Plasma polymerization of selected organic compounds, Elsevier Science Ltd., Polymer, vol. 37, No. 2, 1996, pp. 333-342.

Gonzalez-Meijome et al., Equivalences Between Refractive Index and Equilibrium Water Content of Conventional and Silicone Hydrogel Soft Contact Lenses From Automated and Manual Refractometry, Wiley Periodicals, Inc., Journal of Biomedical Materials Research Part B: Applied Biomaterials, 2006, pp. 184-191.

Ho et al., Ultrathin coating of plasma polymer of methane applied on the surface of silicone contact lenses, Journal of Biomedical Materials Research, John Wiley & Sons, Inc., vol. 22, 1988, pp. 919-937.

Mort et al., Plasma Deposited Thin Films, CRC Press, 1986, pp. 1-19.

Medard et al., CO2, H2O, and CO2/H20 Plasma Chemistry for Polyethylene Surface Modification, American Chemical Society, Langmuir, vol. 18, No. 6, 2002, pp. 2246-2253.

Schmidt et al., Simple Coupling Chemistry Linking Carboxyl-Containing Organic Molecules to Silicon Oxide Surfaces under Acidic Conditions, American Chemical Society, Langmuir, vol. 26, No. 19, 2010, pp. 15333-15338.

Siow et al., Plasma Methods for the Generation of Chemically Reactive Surfaces for Biomolecule Immobilization and Cell Colonization—A Review, Wiley-VCH Verlag GmbH & Co., Plasma Processes and Polymer, vol. 3, 2006, pp. 392-418.

Spagnola et al., Surface texture and wetting stability of polydimethylsiloxane coated with aluminum oxide at low temperature by atomic layer deposition, American Vacuum Society, Journal of Vacuum Science & Technology, vol. 28, No. 6, 2010, pp. 1330-1337.

Terlingen et al., Introduction of Functional Groups on Polyethylene Surfaces by a Carbon Dioxide Plasma Treatment, Journal of Applied Polymer Science, vol. 57, 1995, pp. 969-982.

Weikart et al., Evaluation of plasma polymer-coated contact lenses by electrochemical impedance spectroscopy, John Wiley & Sons, Inc., 2000, pp. 597-607.

H. Yasuda, Glow Discharge Polymerization, 1981 John Wiley & Sons, Inc., Journal of Polymer Science: Macromolecular Reviews, vol. 16, 1981, pp. 199-293.

Yasuda et al., Ultrathin Coating by Plasma Polymerization Applied to Corneal Contact Lens, John Wiley & Sons, Inc., Journal Biomedical Materials Research, vol. 9, 1975, pp. 629-643.

Zhou et al., Recent developments in PDMS surface modification for microfluidic devices, Electrophoresis, vol. 31, 2010, pp. 2-16.

Kim et al., Effect of Discharge Gases on Microwave Plasma Reactions of Imidazole on Poly(dimethylsilyoxane) Surfaces: Quantitative ATR FT-IR Spectroscopic Analysis, Langmuir, American Chemical Society, 1999, vol. 15, No. 10, pp. 3499-3505.

J.M.K. Ng et al., Components for integrated poly(dimethylsiloxane) microfluidic systems, Electrophoresis, vol. 23, Wiley-VCH Verlag GmbH & Co., 2002, pp. 3461-3473.

R. Hartmann; Plasma Polymerisation: Grundlagen, Technik and Anwendung, Jahrb. Oberflächentechnik (1993) 49, pp. 283-296; Google translated to "Yearbook Basic technology Tape 49, Plasma Basics, technology and applications." No translation was available other than a rough Google translation that is attached.

* cited by examiner

METHOD FOR PRODUCING CONTACT LENSES WITH DURABLE LUBRICIOUS COATINGS THEREON

This application claims the benefit under 35 U.S.C. §119 (e) of U.S. provisional application Ser. No. 62/214,240 filed on Sep. 4, 2015, herein incorporated by reference in its entirety.

The present invention generally relates to a method for producing silicone hydrogel contact lenses having a stable lubricious coating. In addition, the present invention provides silicone hydrogel contact lenses produced according to the method of the invention.

BACKGROUND

Soft silicone hydrogel contact lenses are increasingly becoming popular because of their high oxygen permeability and comfort. But, a silicone hydrogel material typically has a surface, or at least some areas of its surface, which is hydrophobic (non-wettable) and susceptible to adsorbing lipids or proteins from the ocular environment and may adhere to the eye. Thus, a silicone hydrogel contact lens will generally require a surface modification.

A known approach for modifying the hydrophilicity of a relatively hydrophobic contact lens material is through the use of a plasma treatment, for example, commercial lenses such as Focus NIGHT & DAY™ and O2OPTIX™ (CIBA VISION), and PUREVISION™ (Bausch & Lomb) utilize this approach in their production processes. Advantages of a plasma coating, such as, e.g., those may be found with Focus NIGHT & DAY™, are its durability, relatively high hydrophilicity/wettability), and low susceptibility to lipid and protein deposition and adsorption. But, plasma treatment of silicone hydrogel contact lenses may not be cost effective, because the preformed contact lenses must typically be dried before plasma treatment and because of relative high capital investment associated with plasma treatment equipment. Further, plasma treatment may not provide a silicone hydrogel contact lens with a desirable surface lubricity.

Another approach for modifying the hydrophilicity of a relatively hydrophobic contact lens material is a layer-by-layer (LbL) polyionic material deposition technique (see for example, U.S. Pat. No. 6,451,871, U.S. Pat. No. 6,719,929, U.S. Pat. No. 6,793,973, U.S. Pat. No. 6,884,457, U.S. Pat. No. 6,896,926, U.S. Pat. No. 6,926,965, U.S. Pat. No. 6,940,580, and U.S. Pat. No. 7,297,725, and U.S. Patent Application Publication Nos. US 2007/0229758A1, US 2008/0174035A1, and US 2008/0152800A1). Although the LbL deposition technique can provide a cost effective process for rendering a silicone hydrogel material wettable, LbL coatings may not be as durable as plasma coatings and may have relatively high densities of surface charges, in particular, negative surface charges; which may interfere with contact lens cleaning and disinfecting solutions due to their high susceptibility to deposition and accumulation of positively charged antimicrobials (e.g., polyhexamethylene biguanide, Polyquaternium-1®, or the like) commonly found in most multipurpose lens care solutions. Those positively charged antimicrobials adsorbed by the silicone hydrogel lenses may be released into the eye and may cause undesirable clinical symptoms in some persons, such as diffuse corneal staining and product intolerance, when the lenses are worn by patients. To improve the durability, crosslinking of LbL coatings on contact lenses has been proposed in commonly-owned copending US patent application publication Nos. 2008/0226922 A1 and 2009/ 0186229 A1 (incorporated by reference in their entireties). However, crosslinked LbL coatings may have a hydrophilicity and/or wettability inferior than original LbL coatings (prior to crosslinking) and still have relative high densities of negative surface charges.

US Patent Application Publication No. 2008/0142038A1 describes another approach for modifying the hydrophilicity of a relatively hydrophobic contact lens material. According to this approach, a preformed silicone hydrogel contact lens in unhydrated state is subjected to a oxidation plasma treatment in an atmosphere composed of a suitable media, such as, ammonia, an alkylamine, air, water, peroxide, oxygen gas, methanol, acetone, etc., in order to improve or promote adhesion for bonding of the subsequent carboxylic acid-containing polymeric or copolymeric layer; then the plasma-treated lens is extracted in an organic solvent (e.g., iropropanol), rehydrated in water, and packaged in a polypropylene blister pack containing a coating solution of a polyanionic polymer (e.g., polyacrylaic acid); and finally the packaged lens is sterilized in steam in an autoclave at a temperature up to and including 100° C. This approach would still have the above-described shortcomings for the LbL-approach, such as, high susceptibility to deposition and accumulation of positively charged antimicrobials in a lens care solution and insufficient durability.

U.S. Pat. No. 6,630,243 disclose another approach for modifying the hydrophilicity of a relatively hydrophobic contact lens material. According to this approach, a preformed silicone hydrogel contact lens in unhydrated state is subjected to plasma polymerization in a hydrocarbon-containing atmosphere to form a polymeric carbonaceous layer on the lens surface; reactive functionalities are then generated on the surface of the carbonaceous layer; and finally a hydrophilic reactive polymer is covalently attached to the surface of the carbonaceous layer through the surface reactive functionalities of the carbonaceous layer. Resultant This approach may not provide a silicone hydrogel contact lens with a desirable surface lubricity.

A still further approach for modifying the hydrophilicity of a relatively hydrophobic contact lens material is to attach hydrophilic polymers onto contact lenses according to various mechanisms (see for example, U.S. Pat. Nos. 6,099,122, 6,436,481, 6,440,571, 6,447,920, 6,465,056, 6,521,352, 6,586,038, 6,623,747, 6,730,366, 6,734,321, 6,835,410, 6,878,399, 6,923,978, 6,440,571, and 6,500,481, US Patent Application Publication Nos. 2009/0145086 A1, 2009/0145091A1, 2008/0142038A1, and 2007/0122540A1, all of which are herein incorporated by reference in their entireties). Although those techniques can be use in rendering a silicone hydrogel material wettable, they may not be cost-effective and/or time-efficient for implementation in a mass production environment, because they typically require relatively long time and/or involve laborious, multiple steps to obtain a hydrophilic coating.

Recently, a new cost-effective approach has been described in U.S. pat. Appl. pub. No. 2012/0026457 A1 (herein incorporated by reference in its entirety) for applying a non-silicone hydrogel coating onto a silicone hydrogel contact lens, in which an organic solvent-based coating solution of a polyanionic polymer is involved in forming an interpenetrating base coating (i.e., an anchoring layer) on a silicone hydrogel contact lens and then a partially-crosslinked hydrophilic polymer material are covalently attached onto the anchoring layer directly in a lens package during autoclave. Although silicone hydrogel contact lenses produced according to such an approach can have a water-gradient structural configuration and a soft and lubricious surface, they may be susceptible to high deposition and accumulation of positively charged antimicrobials commonly found in most multipurpose lens care solutions, due to the presence of the anchoring layer of a polyanionic material.

Therefore, there is still a need for an improved method for producing silicone hydrogel contact lenses with a durable, lubricious non-silicone hydrogel coating which has a minimized susceptibility to high deposition and accumulation of positively charged antimicrobials. There is also a need for silicone hydrogel contact lenses with such a durable coating thereon.

SUMMARY OF THE INVENTION

The invention, in one aspect, provides a method for producing soft contact lenses, the method of invention comprising the steps of: (1) obtaining a preformed silicone hydrogel contact lens in a dry state; (2) subjecting the preformed silicone hydrogel contact lens in the dry state to a surface treatment to obtain a silicone hydrogel contact lens with a base coating thereon, wherein the base coating comprises a prime plasma layer, a reactive polymer layer on top of the prime plasma layer, and reactive functional groups selected from the group consisting of carboxyl groups, primary amino groups, secondary amino groups, and combinations thereof, wherein the surface treatment comprises the sub-steps of (a) plasma-treating the surface of the preformed silicone hydrogel contact lens in the dry state with a plasma to obtain a silicone hydrogel contact lens with the prime plasma layer thereon, wherein the plasma is generated in a plasma gas (i.e., an atmosphere) composed of air, $N_2$, $O_2$, $CO_2$, or a mixture of a $C_1$-$C_6$ hydrocarbon and a secondary gas selected from the group consisting of air, $N_2$, $O_2$, $CO_2$, and combinations thereof, wherein the prime plasma layer has a thickness of from about 0.5 nm to about 40 nm, and (b) contacting the silicone hydrogel contact lens with the prime plasma layer thereon with a first aqueous solution including a reactive hydrophilic polymer having multiple reactive functional groups selected from the group consisting of carboxyl groups, primary amino groups, secondary amino groups, and combinations thereof to form the base coating which include the reactive polymer layer of the reactive hydrophilic polymer on top of the prime plasma layer; and (3) heating the silicone hydrogel contact lens with the base coating thereon obtained in step (2), in a second aqueous solution which comprises a water-soluble and thermally-crosslinkable hydrophilic polymeric material having azetidinium groups and optionally (but preferably) primary or secondary amino groups and/or carboxyl groups, at a temperature of from about 60° C. to about 140° C. for a time period sufficient long to crosslink the water-soluble thermally-crosslinkable hydrophilic polymeric material and the base coating so as to form a hydrogel coating on the silicone hydrogel contact lens, wherein the hydrogel coating on the silicone hydrogel contact lens in fully hydrated state has a WBUT of at least about 10 seconds and a friction rating of about 3 or lower.

In another aspect, the invention provides a silicone hydrogel contact lens obtained according to a method of the invention, wherein the silicone hydrogel contact lens has an oxygen permeability of at least about 40 barrers, a water contact angle of less than 80 degrees, a WBUT of at least about 10 seconds, a friction rating of about 3 or lower, and a coating durability characterized by surviving at least 7 cycles of digital rubbing test.

These and other aspects of the invention will become apparent from the following description of the presently preferred embodiments. The detailed description is merely illustrative of the invention and does not limit the scope of the invention, which is defined by the appended claims and equivalents thereof. As would be obvious to one skilled in the art, many variations and modifications of the invention may be effected without departing from the spirit and scope of the novel concepts of the disclosure.

DETAILED DESCRIPTION OF EMBODIMENTS OF THE INVENTION

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well-known and commonly employed in the art.

"Contact Lens" refers to a structure that can be placed on or within a wearer's eye. A contact lens can correct, improve, or alter a user's eyesight, but that need not be the case. A contact lens can be of any appropriate material known in the art or later developed, and can be a soft lens, a hard lens, or a hybrid lens. A "silicone hydrogel contact lens" refers to a contact lens comprising a silicone hydrogel bulk (core) material.

A "soft contact lens" refers to a contact lens which has an elastic modulus (i.e., Young's modulus) of less than 2.5 MPa.

A "hydrogel" or "hydrogel material" refers to a crosslinked polymeric material which has three-dimensional polymer networks (i.e., polymer matrix), is insoluble in water, but can hold at least 10 percent by weight of water in its polymer matrix when it is fully hydrated.

A "silicone hydrogel" refers to a silicone-containing hydrogel obtained by copolymerization of a polymerizable composition comprising at least one silicone-containing monomer or at least one silicone-containing macromer or at least one crosslinkable silicone-containing prepolymer.

As used in this application, the term "non-silicone hydrogel" refers to a hydrogel that is theoretically free of silicon.

"Hydrophilic," as used herein, describes a material or portion thereof that will more readily associate with water than with lipids.

"Surface hydrophilicity", as used herein, describes a surface property that represents the extent to which a surface interacts with water, as measured by water-break-up-time (WBUT). The higher the value of WBUT is, the higher the surface hydrophilicity is.

In accordance with the invention, the "surface lubricity" of a contact lens (or a medical device) is measured by a friction rating which is a number from 0 to 4. The higher the value of friction rating is, the lower the surface lubricity is.

A "vinylic monomer" refers to a compound that has one sole ethylenically unsaturated group, is soluble in a solvent, and can be polymerized actinically or thermally.

The term "soluble", in reference to a compound or material in a solvent, means that the compound or material can be dissolved in the solvent to give a solution with a concentration of at least about 0.1% by weight at room temperature (i.e., a temperature of about 22° C. to about 28° C.).

The term "insoluble", in reference to a compound or material in a solvent, means that the compound or material can be dissolved in the solvent to give a solution with a concentration of less than 0.005% by weight at room temperature (as defined above).

As used in this application, the term "ethylenically unsaturated group" is employed herein in a broad sense and is intended to encompass any groups containing at least one >C=C< group. Exemplary ethylenically unsaturated groups include without limitation (meth)acryloyl

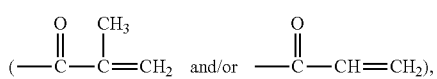

allyl, vinyl, styrenyl, or other C=C containing groups.

The term "(meth)acrylamide" refers to methacrylamide and/or acrylamide.

The term "(meth)acrylate" refers to methacrylate and/or acrylate.

As used herein, "actinically" in reference to curing, crosslinking or polymerizing of a polymerizable composition, a prepolymer or a material means that the curing (e.g., crosslinked and/or polymerized) is performed by actinic irradiation, such as, for example, UV/visible irradiation, ionizing radiation (e.g. gamma ray or X-ray irradiation), microwave irradiation, and the like. Thermal curing or actinic curing methods are well-known to a person skilled in the art.

A "hydrophilic vinylic monomer", as used herein, refers to a vinylic monomer which as a homopolymer typically yields a polymer that is water-soluble or can absorb at least 10 percent by weight of water.

A "hydrophobic vinylic monomer", as used herein, refers to a vinylic monomer which as a homopolymer typically yields a polymer that is insoluble in water and can absorb less than 10 percent by weight of water.

A "macromer" or "prepolymer" refers to a compound or polymer that contains ethylenically unsaturated groups and has an average molecular weight of greater than 700 Daltons.

As used in this application, the term "vinylic crosslinker" refers to a compound having at least two ethylenically unsaturated groups. A "vinylic crosslinking agent" refers to a vinylic crosslinker having a molecular weight of 700 Daltons or less.

As used in this application, the term "polymer" means a material formed by polymerizing/crosslinking one or more monomers or macromers or prepolymers or combinations thereof.

As used in this application, the term "molecular weight" of a polymeric material (including monomeric or macromeric materials) refers to the weight-average molecular weight unless otherwise specifically noted or unless testing conditions indicate otherwise.

A "polysiloxane" refers to a compound containing a polysiloxane segment of

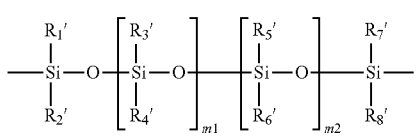

in which m1 and m2 independently of each other are an integer of from 0 to 500 and (m1+m2) is from 2 to 500, $R_1'$, $R_2'$, $R_3'$, $R_4'$, $R_5'$, $R_6'$, $R_7'$, and $R_8'$ independently of one another, are $C_1$-$C_{10}$ alkyl, $C_1$-$C_4$ alkyl- or $C_1$-$C_4$-alkoxy-substituted phenyl, $C_1$-$C_{10}$ fluoroalkyl, $C_1$-$C_{10}$ fluoroether, $C_6$-$C_{18}$ aryl radical, -alk-$(OC_2H_4)_{m3}$—OR' (in which alk is $C_1$-$C_6$ alkyl diradical, R' is H or $C_1$-$C_4$ alkyl and m3 is an integer from 1 to 10), or a linear hydrophilic polymer chain.

A "polycarbosiloxane" refers to a compound containing a polycarbosiloxane segment of

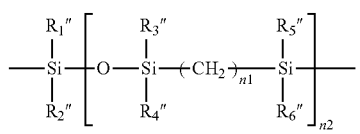

in which n1 is an integer of 2 or 3, n2 is an integer of from 2 to 100 (preferably from 2 to 20, more preferably from 2 to 10, even more preferably from 2 to 6), $R_1''$, $R_2''$, $R_3''$, $R_4''$, $R_5''$, and $R_6''$ independent of one another are a $C_1$-$C_6$ alkyl radical (preferably methyl).

The term "fluid" as used herein indicates that a material is capable of flowing like a liquid.

The term "alkyl" refers to a monovalent radical obtained by removing a hydrogen atom from a linear or branched alkane compound. An alkyl group (radical) forms one bond with one other group in an organic compound.

The term "alkylene divalent group" or "alkylene diradical" or "alkyl diradical" interchangeably refers to a divalent radical obtained by removing one hydrogen atom from an alkyl. An alkylene divalent group forms two bonds with other groups in an organic compound.

The term "alkyl triradical" refers to a trivalent radical obtained by removing two hydrogen atoms from an alkyl. An alkyl triradical forms three bonds with other groups in an organic compound.

The term "alkoxy" or "alkoxyl" refers to a monovalent radical obtained by removing the hydrogen atom from the hydroxyl group of a linear or branched alkyl alcohol. An alkoxy group (radical) forms one bond with one other group in an organic compound.

In this application, the term "substituted" in reference to an alkyl diradical or an alkyl radical means that the alkyl diradical or the alkyl radical comprises at least one substituent which replaces one hydrogen atom of the alkyl diradical or the alkyl radical and is selected from the group consisting of hydroxy (—OH), carboxy (—COOH), —NH₂, sulfhydryl (—SH), $C_1$-$C_4$ alkyl, $C_1$-$C_4$ alkoxy, $C_1$-$C_4$ alkylthio (alkyl sulfide), $C_1$-$C_4$ acylamino, $C_1$-$C_4$ alkylamino, di-$C_1$-$C_4$ alkylamino, halogen atom (Br or Cl), and combinations thereof.

In this application, an "oxazoline" refers to a compound of

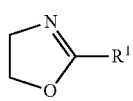

in which: $R^1$ is hydrogen, methyl, ethyl, N-pyrrolidonylmethyl, N-pyrrolidonylethyl, N-pyrrolidonylpropyl, or a monovalent radical of -alk-$(OC_2H_4)_{m3}$—OR'' in which alk is $C_1$-$C_4$ alkyl diradical; R'' is $C_1$-$C_4$ alkyl (preferably methyl); and m3 is an integer from 1 to 10 (preferably 1 to 5).

In this application, the term "polyoxazoline" refers to a linear polymer having a formula of

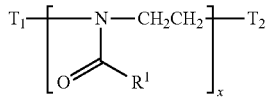

in which: T1 and T2 are two terminal groups; $R^1$ is hydrogen, methyl, ethyl, N-pyrrolidonylmethyl, N-pyrrolidonylethyl, N-pyrrolidonylpropyl, or a monovalent radical of -alk-$(OC_2H_4)_{m3}$—OR" in which alk is $C_1$-$C_4$ alkyl diradical; R" is $C_1$-$C_4$ alkyl (preferably methyl); m3 is an integer from 1 to 10 (preferably 1 to 5); x is an integer from 5 to 500. A polyoxazoline segment has a divalent polymer chain of a formula of

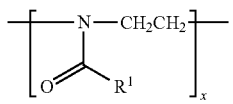

in which $R^1$ and x are as defined above.

In this application, the term "poly(2-oxazoline-co-ethyleneimine)" refers to a statistical copolymer having a formula of

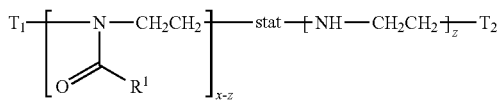

in which: T1 and T2 are terminal groups; $R^1$ is hydrogen, methyl, ethyl, N-pyrrolidonylmethyl, N-pyrrolidonylethyl, N-pyrrolidonylpropyl, or a monovalent radical of -alk-$(OC_2H_4)_{m3}$—OR" in which alk is $C_1$-$C_4$ alkyl diradical; R" is $C_1$-$C_4$ alkyl (preferably methyl); m3 is an integer from 1 to 10 (preferably 1 to 5); x is an integer from 5 to 500; z is an integer equal to or less than x. A poly(2-oxazoline-co-ethyleneimine) is obtained by hydrolyzing a polyoxazoline.

In this application, the term "poly(2-oxazoline-co-ethyleneimine)-epichlorohydrin" refers to a polymer obtained by reacting a poly(2-oxazoline-co-ethyleneimine) with epichlorohydrin to convert all or substantial percentage (≥90%) of the secondary amine groups of the poly(2-oxazoline-co-ethyleneimine) into azetidinium groups. Examples of poly(2-oxazoline-co-ethyleneimine)-epichlorohydrin are disclosed in U.S. pat. Appl. pub. No. 2016/0061995 A1 (herein incorporated by reference in its entirety).

An "epichlorohydrin-functionalized polyamine" or "epichlorohydrin-functionalized polyamidoamine" refers to a polymer obtained by reacting a polyamine or polyamidoamine with epichlorohydrin to convert all or a substantial percentage of the secondary amine groups of the polyamine or polyamidoamine into azetidinium groups.

The term "polyamidoamine-epichlorohydrin" refers to an epichlorohydrin-functionalized adipic acid-diethylenetriamine copolymer.

In this application the term "azetidinium" or "3-hydroxyazetidinium" refers to a positively-charged, divalent radical (or group or moiety) of

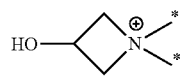

The term "thermally-crosslinkable" in reference to a polymeric material or a functional group means that the polymeric material or the functional group can undergo a crosslinking (or coupling) reaction with another material or functional group at a relatively-elevated temperature (from about 40° C. to about 140° C.), whereas the polymeric material or functional group cannot undergo the same crosslinking reaction (or coupling reaction) with another material or functional group at room temperature (i.e., from about 22° C. to about 28° C., preferably from about 24° C. to about 26° C., in particular at about 25° C.) to an extend detectable for a period of about one hour.

The term "azlactone" refers to a mono-valent radical of formula

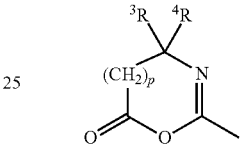

in which p is 0 or 1; $^3R$ and $^4R$ independently of each other is $C_1$-$C_8$ alkyl (preferably methyl).

As used in this application, the term "phosphorylcholine" refers to a monovalent zwitterionic group of

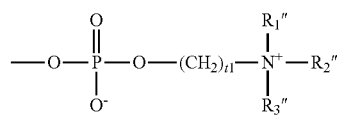

in which t1 is an integer of 1 to 5 and $R_1"$, $R_2"$ and $R_3"$ independently of one another are $C_1$-$C_8$ alkyl or $C_1$-$C_8$ hydroxyalkyl.

As used in this application, the term "reactive vinylic monomer" refers to any vinylic monomer having at least one reactive functional group selected from the group consisting of carboxyl group, primary amino group, and secondary amino group.

As used in this application, the term "non-reactive vinylic monomer" refers to any vinylic monomer (either hydrophilic or hydrophobic vinylic monomer) free of carboxyl group, primary amino group, secondary amino group, epoxide group, isocyanate group, azlactone group, or aziridine group.

A free radical initiator can be either a photoinitiator or a thermal initiator. A "photoinitiator" refers to a chemical that initiates free radical crosslinking/polymerizing reaction by the use of light. A "thermal initiator" refers to a chemical that initiates radical crosslinking/polymerizing reaction by the use of heat energy.

A "spatial limitation of actinic radiation" refers to an act or process in which energy radiation in the form of rays is directed by, for example, a mask or screen or combinations thereof, to impinge, in a spatially restricted manner, onto an area having a well-defined peripheral boundary. A spatial limitation of UV radiation is obtained by using a mask or screen having a radiation (e.g., UV) permeable region, a radiation (e.g., UV) impermeable region surrounding the radiation-permeable region, and a projection contour which is the boundary between the radiation-impermeable and radiation-permeable regions, as schematically illustrated in the drawings of U.S. Pat. No. 6,800,225 (FIGS. 1-11), and 6,627,124 (FIGS. 1-9), 7,384,590 (FIGS. 1-6), and 7,387,759 (FIGS. 1-6), all of which are incorporated by reference in their entireties. The mask or screen allows to spatially projects a beam of radiation (e.g., UV radiation) having a cross-sectional profile defined by the projection contour of the mask or screen. The projected beam of radiation (e.g., UV radiation) limits radiation (e.g., UV radiation) impinging on a lens formulation located in the path of the projected beam from the first molding surface to the second molding surface of a mold. The resultant contact lens comprises an anterior surface defined by the first molding surface, an opposite posterior surface defined by the second molding surface, and a lens edge defined by the sectional profile of the projected UV beam (i.e., a spatial limitation of radiation). The radiation used for the crosslinking is radiation energy, especially UV radiation, gamma radiation, electron radiation or thermal radiation, the radiation energy preferably being in the form of a substantially parallel beam in order on the one hand to achieve good restriction and on the other hand efficient use of the energy.

A "water contact angle" refers to an average water contact angle (i.e., contact angles measured by Sessile Drop method) at the room temperature, which is obtained by averaging measurements of contact angles with at least 3 individual contact lenses.

The term "intactness" in reference to a coating on a silicone hydrogel contact lens is intended to describe the extent to which the contact lens can be stained by Sudan Black in a Sudan Black staining test described in Example 1. Good intactness of the coating on a silicone hydrogel contact lens means that there is practically no Sudan Black staining of the contact lens.

The term "durability" in reference to a coating on a silicone hydrogel contact lens is intended to describe that the coating on the silicone hydrogel contact lens can survive a desired number of cycles of digital rubbing tests.

As used herein, "surviving a number ("j") of cycles of digital rubbing tests" in reference to a coating on a contact lens means that after j cycles of digitally rubbing tests according to the procedure described in Example 1, the contact lens has a digital-rubbing-induced reduction in WBUT after j cycles of digital rubbing tests, $\Delta WBUT_{DR}(j)$, of about 45% or less (preferably about 35% or less, more preferably about 25% or less, even more preferably about 15% or less) and optionally a digital-rubbing-induced increase in friction rating after j cycles of digital rubbing tests, $\Delta FR_{DR}(j)$, of about 60% or less (preferably about 50% or less, more preferably about 40% or less, even more preferably about 30% or less), wherein $$\Delta WBUT_{DR}(j) = \frac{WBUT_{ODR} \cdot WBUT_{jDR}}{WBUT_{ODR}} \times 100\% \text{ and}$$

$$\Delta FR_{DR}(j) = \frac{FR_{jDR} \cdot FR_{ODR}}{4} \times 100\%$$

in which $WBUT_{ODR}$ and $FR_{ODR}$ are the WBUT and the friction rating of the contact lens which is in fully-hydrated state and is subjected to zero digital rubbing test, and $WBUT_{jDR}$ and $FR_{jDR}$ are the WBUT and the friction rating of the contact lens which is in fully hydrated state and has been subjected to at least j cycles of digital rubbing tests, wherein j is an integer of 2 (preferably 7, more preferably 14, even more preferably 30).

The term "one cycle of digital rubbing test" means that contact lenses (or medical devices) with a coating thereon are digitally rubbed (wearing disposable powder-free latex gloves) with RENU® multi-purpose lens care solution (or another multi-purpose lens care solution) for 20 seconds and then rinsed with saline. The above procedure can be repeated for a given times, e.g., from 2 to 30 times and number of repetitions of digital rubbing tests is the number of cycles of digital rubbing tests.

The intrinsic "oxygen permeability", Dk, of a material is the rate at which oxygen will pass through a material. As used in this application, the term "oxygen permeability (Dk)" in reference to a hydrogel (silicone or non-silicone) or a contact lens means a measured oxygen permeability (Dk) which is corrected for the surface resistance to oxygen flux caused by the boundary layer effect according to the procedures described in Example 1 of 2012/0026457 A1 (herein incorporated by reference in its entirety). Oxygen permeability is conventionally expressed in units of barrers, where "barrer" is defined as $[(cm^3 \text{ oxygen})(mm)/(cm^2)(sec)(mm Hg)] \times 10^{-10}$.

The "oxygen transmissibility", Dk/t, of a lens or material is the rate at which oxygen will pass through a specific lens or material with an average thickness of t [in units of mm] over the area being measured. Oxygen transmissibility is conventionally expressed in units of barrers/mm, where "barrers/mm" is defined as $[(cm^3 \text{ oxygen})/(cm^2)(sec)(mm Hg)] \times 10^{-9}$.

The "ion permeability" through a lens correlates with the Ionoflux Diffusion Coefficient. The Ionoflux Diffusion Coefficient, D (in units of [mm²/min]), is determined by applying Fick's law as follows:

$$D = -n'/(A \times dc/dx)$$

where n'=rate of ion transport [mol/min]; A=area of lens exposed [mm²]; dc=concentration difference [mol/L]; dx=thickness of lens [mm].

"Ophthalmically compatible", as used herein, refers to a material or surface of a material which may be in intimate contact with the ocular environment for an extended period of time without significantly damaging the ocular environment and without significant user discomfort.

The term "ophthalmically safe" with respect to a packaging solution for sterilizing and storing contact lenses is meant that a contact lens stored in the solution is safe for direct placement on the eye without rinsing after autoclave and that the solution is safe and sufficiently comfortable for daily contact with the eye via a contact lens. An ophthalmically-safe packaging solution after autoclave has a tonicity and a pH that are compatible with the eye and is substantially free of ocularly irritating or ocularly cytotoxic materials according to international ISO standards and U.S. FDA regulations.

The term "modulus" or "elastic modulus" in reference to a contact lens or a material means the tensile modulus or Young's modulus which is a measure of the stiffness of a contact lens or a material. The modulus can be measured using a method in accordance with ANSI Z80.20 standard. A person skilled in the art knows well how to determine the elastic modulus of a silicone hydrogel material or a contact lens. For example, all commercial contact lenses have reported values of elastic modulus.

An "aqueous solution" or a "water-based solution" interchangeably refers to a solution which is a homogeneous mixture consisting of a water-based solvent and one or more solutes dissolved in the water-based solvent. A "water-based solvent" is intended to describe a solvent system which consists of at least 50% (preferably at least about 60%, more preferably at least about 80%, even more preferably at least about 90%, in particular at least about 95%) by weight of water and at most 50% (preferably about 40% or less, more preferably about 20% or less, even more preferably about 10% or less, in particular about 5% or less) by weight of one or more organic solvents relative to the weight of the solvent system. An aqueous coating solution refers to an aqueous solution containing at least one polymeric coating material as a solute in the solution.

An "organic-based solution" refers to a solution which is a homogeneous mixture consisting of an organic-based solvent and one or more solutes dissolved in the organic based solvent. An "organic-based solvent" is intended to describe a solvent system which consists of one or more organic solvents and less than 49%, preferably about 40% or less, more preferably about 20% or less, even more preferably about 10% or less, in particular about 5% or less by weight of water relative to the weight of the solvent system. An organic-based coating solution refers to an organic-based solution containing at least one polymeric coating material as a solute in the solution.

In this application, the term "quenching" in reference to a plasma-treated silicone hydrogel contact lens refers to a process in which the plasma-treated silicone hydrogel contact lens (still in a dry state) is in contact with (e.g., being immersed in or sprayed with) any liquid at the first time within about 40 minutes or less immediately after the plasma treatment.

The invention is generally related to a method for producing silicone hydrogel contact lenses with a non-silicone hydrogel coating thereon, wherein the resultant non-silicone hydrogel coating has a WBUT of at least 10 seconds (preferably at least about 12.5 seconds, more preferably at least about 15 seconds, even more preferably at least about 17.5 seconds) and a friction rating of about 3 or lower (preferably about 2.5 or lower, more preferably about 2 or lower, even more preferably about 1.5 or lower, most preferably about 1 or lower).

The invention, in one aspect, provides a method for producing soft contact lenses, the method of invention comprising the steps of:

(1) obtaining a preformed silicone hydrogel contact lens in a dry state;
(2) subjecting the preformed silicone hydrogel contact lens in the dry state to a surface treatment to obtain a silicone hydrogel contact lens with a base coating thereon, wherein the base coating comprises a prime plasma layer, a reactive polymer layer on top of the prime plasma layer, and reactive functional groups selected from the group consisting of carboxyl groups, primary amino groups, secondary amino groups, and combinations thereof, wherein the surface treatment comprises the sub-steps of
   (a) plasma-treating the surface of the preformed silicone hydrogel contact lens in the dry state with a plasma to obtain a silicone hydrogel contact lens with the prime plasma layer thereon, wherein the plasma is generated in a plasma gas (i.e., an atmosphere) composed of air, $N_2$, $O_2$, $CO_2$, or a mixture of a $C_1$-$C_6$ hydrocarbon and a secondary gas selected from the group consisting of air, $N_2$, $O_2$, $CO_2$, and combinations thereof, preferably air, $CO_2$, or a mixture of a $C_1$-$C_4$ hydrocarbon and a secondary gas selected from the group consisting of air, $CO_2$, $N_2$, and combinations thereof, more preferably air, $CO_2$ or a mixture of methane and a secondary gas selected from the group consisting of air, $CO_2$, $N_2$, and combinations thereof, even more preferably $CO_2$ or a mixture of methane and air or $CO_2$, wherein the prime plasma layer has a thickness of from about 0.5 nm to about 40 nm (preferably from about 1 nm to about 35 nm, more preferably from about 2 nm to about 30 nm, even more preferably from about 3 nm to about 25 nm), and
   (b) contacting the silicone hydrogel contact lens with the prime plasma layer thereon with a first aqueous solution including a reactive hydrophilic polymer having multiple reactive functional groups selected from the group consisting of carboxyl groups, primary amino groups, secondary amino groups, and combinations thereof to form the base coating which include the reactive polymer layer of the reactive hydrophilic polymer on top of the prime plasma layer; and
(3) heating the silicone hydrogel contact lens with the base coating thereon obtained in step (2), in a second aqueous solution which comprises a water-soluble and thermally-crosslinkable hydrophilic polymeric material having azetidinium groups and optionally (but preferably) primary or secondary amino groups and/or carboxyl groups, at a temperature of from about 60° C. to about 140° C. for a time period sufficient long to crosslink the water-soluble thermally-crosslinkable hydrophilic polymeric material and the base coating so as to form a hydrogel coating on the silicone hydrogel contact lens, wherein the hydrogel coating on the silicone hydrogel contact lens in fully hydrated state has a WBUT of at least about 10 seconds (preferably at least about 12.5 seconds, more preferably at least about 15 seconds, even more preferably at least about 17.5 seconds) and a friction rating of about 3 or lower (preferably about 2.5 or lower, more preferably about 2 or lower, even more preferably about 1.5 or lower, most preferably about 1 or lower).

In accordance with the invention, a preformed silicone hydrogel contact lens is any silicone hydrogel contact lens which has not been subjected to any surface treatment after being produced according to any lens manufacturing processes. A person skilled in the art knows very well how to make preformed silicone hydrogel (SiHy) contact lenses. For example, SiHy contact lenses can be produced in a conventional "spin-casting mold," as described for example in U.S. Pat. No. 3,408,429, or by the full cast-molding process in a static form, as described in U.S. Pat. Nos. 4,347,198; 5,508,317; 5,583,463; 5,789,464; and 5,849,810, or by lathe cutting of silicone hydrogel buttons as used in making customized contact lenses. In cast-molding, a lens formulation typically is dispensed into molds and cured (i.e., polymerized and/or crosslinked) in molds for making contact lenses. For production of silicone hydrogel (SiHy) contact lenses, a SiHy lens-forming composition (or SiHy lens formulation) for cast-molding or spin-cast molding or for making SiHy rods used in lathe-cutting of contact lenses generally comprises at least one components selected from the group consisting of a silicone-containing vinylic monomer, a silicone-containing vinylic macromer, a silicone-containing prepolymer, a hydrophilic vinylic monomer, a hydrophobic vinylic monomer, a vinylic crosslinking agent (a compound having a molecular weight of about 700 Daltons or less and containing at least two ethylenically unsaturated groups), a free-radical initiator (photoinitiator or thermal initiator), a hydrophilic vinylic macromer/prepolymer, and combination thereof, as well known to a person skilled in the art. A SiHy contact lens formulation can also comprise other necessary components known to a person skilled in the art, such as, for example, a UV-absorbing agent (i.e., UV-absorbing vinylic monomers), a visibility tinting agent (e.g., dyes, pigments, or mixtures thereof), antimicrobial agents (e.g., preferably silver nanoparticles), a bioactive agent, leachable lubricants, leachable tear-stabilizing agents, and mixtures thereof, as known to a person skilled in the art. Resultant SiHy contact lenses then can be subjected to extraction with an extraction solvent to remove unpolymerized components from the resultant lenses and to hydration process, as known by a person skilled in the art. In addition, a preformed SiHy contact lens can be a colored contact lens (i.e., a SiHy contact lens having at least one colored patterns printed thereon as well known to a person skilled in the art).

All the components discussed above in a SiHy lens formulation are well known to a person skilled in the art as evidenced by the fact that numerous SiHy lens formulations have been described in numerous patents and patent applications published by the filing date of this application. All of them can be used in obtaining a preformed SiHy lens in the invention. A SiHy lens formulation for making commercial SiHy lenses, such as, lotrafilcon A, lotrafilcon B, balafilcon A, galyfilcon A, senofilcon A, narafilcon A, narafilcon B, comfilcon A, enfilcon A, asmofilcon A, somofilcon A, stenfilcon A, smafilcon A, enfilcon A, and efrofilcon A can also be used in making preformed SiHy contact lenses.

Lens molds for making contact lenses are well known to a person skilled in the art and, for example, are employed in cast molding or spin casting. For example, a mold (for cast molding) generally comprises at least two mold sections (or portions) or mold halves, i.e. first and second mold halves. The first mold half defines a first molding (or optical) surface and the second mold half defines a second molding (or optical) surface. The first and second mold halves are configured to receive each other such that a lens forming cavity is formed between the first molding surface and the second molding surface. The molding surface of a mold half is the cavity-forming surface of the mold and in direct contact with lens-forming material.

Methods of manufacturing mold sections for cast-molding a contact lens are generally well known to those of ordinary skill in the art. The process of the present invention is not limited to any particular method of forming a mold. In fact, any method of forming a mold can be used in the present invention. The first and second mold halves can be formed through various techniques, such as injection molding or lathing. Examples of suitable processes for forming the mold halves are disclosed in U.S. Pat. No. 4,444,711 to Schad; U.S. Pat. No. 4,460,534 to Boehm et al.; U.S. Pat. No. 5,843,346 to Morrill; and U.S. Pat. No. 5,894,002 to Boneberger et al., which are also incorporated herein by reference.

Virtually all materials known in the art for making molds can be used to make molds for making contact lenses. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, N.J.), or the like can be used. Other materials that allow UV light transmission could be used, such as quartz glass and sapphire.

In a preferred embodiment, reusable molds are used and the silicone-hydrogel lens-forming composition is cured actinically under a spatial limitation of actinic radiation to form a SiHy contact lens. Examples of preferred reusable molds are those disclosed in U.S. Pat. Nos. 6,800,225, 7,384,590, and 7,387,759, which are incorporated by reference in their entireties. Reusable molds can be made of quartz, glass, sapphire, $CaF_2$, a cyclic olefin copolymer (such as for example, Topas® COC grade 8007-S10 (clear amorphous copolymer of ethylene and norbornene) from Ticona GmbH of Frankfurt, Germany and Summit, N.J., Zeonex® and Zeonor® from Zeon Chemicals LP, Louisville, Ky.), polymethylmethacrylate (PMMA), polyoxymethylene from DuPont (Delrin), Ultem® (polyetherimide) from G.E. Plastics, PrimoSpire®, etc.

In accordance with the invention, the SiHy lens formulation can be introduced (dispensed) into a cavity formed by a mold according to any known methods.

After the SiHy lens formulation is dispensed into the mold, it is polymerized to produce a preformed contact lens. Crosslinking may be initiated thermally or actinically, preferably by exposing the lens-forming composition in the mold to a spatial limitation of actinic radiation to crosslink the polymerizable components in the SiHy lens formulation.

Opening of the mold so that the molded article can be removed from the mold may take place in a manner known per se.

The molded contact lens can be subject to lens extraction to remove unpolymerized polymerizable components. The extraction solvent can be any solvent known to a person skilled in the art. Examples of suitable extraction solvent are those described above.

A preformed silicone hydrogel contact lens can be dried according to any method known to a person skilled in the art and then be subjected to plasma-treatment by exposing it to a plasma (also referred to as "electrical glow discharge plasma"). Examples of plasma treatment are those disclosed in U.S. Pat. Nos. 4,143,949; 4,312,575; 5,464,667, 6,881,269; and 7,078,074 (herein incorporated by references in their entireties)

A person skilled in the art understand well that a plasma (i.e., electrical glow discharge plasma) is a partially ionized gas which consists of large concentrations of excited atomic, molecular, ionic, and free-radical species and which is generated subjecting a gas in a vacuum chamber to an electric field, typically at radio frequency (rf) (or at a microwave or other frequency). The excited species interact with solid surfaces of an article placed in the plasma, resulting in the chemical and physical modification of the material surface.

For a review of plasma treatment and its uses reference is made to R. Hartmann "Plasma polymerisation: Grundlagen, Technik and Anwendung, Jahrb. Oberflächentechnik (1993) 49, pp. 283-296, Battelle-Inst. e.V. Frankfurt/Main Germany; H. Yasuda, "Glow Discharge Polymerization", Journal of Polymer Science: Macromolecular Reviews, vol. 16 (1981), pp. 199-293; H. Yasuda, "Plasma Polymerization", Academic Press, Inc. (1985); Frank Jansen, "Plasma Deposition Processes", in "Plasma Deposited Thin Films", ed. by T. Mort and F. Jansen, CRC Press Boca Raton (19); O. Auciello et al. (ed.) "Plasma-Surface Interactions and Processing of Materials" publ. by Kluwer Academic Publishers in NATO ASI Series; Series E: Applied Sciences, vol. 176 (1990), pp. 377-399; and N. Dilsiz and G. Akovali "Plasma Polymerization of Selected Organic Compounds", Polymer, vol. 37 (1996) pp. 333-341.

As an illustrated example of plasma treatment of silicone hydrogel contact lenses, one or more preformed silicone hydrogel contact lenses are placed in a reactor chamber between opposing electrodes. The chamber is then sealed and depressurized by a vacuum system. Significant time is required to pump the system to the operative pressure. When a suitable pressure is achieved in the chamber, a process gas (i.e., a plasma gas) is introduced into the chamber interior, and the electrodes are energized. The resulting plasma cloud may apply a thin layer of polymer (or a polymer coating) to the lens and/or change the chemical composition of a top layer of the lens surface depending upon the process gas used. After an appropriate time, the electrodes are de-energized, and the reactor chamber is brought back to atmospheric pressure so that the lenses may be removed.

Plasma treatment systems are known to a person skilled in the art and have been disclosed in patents and articles. For example, Peng Ho and Yasuda describe, in their paper ("Ultrathin Coating Of Plasma Polymer Of Methane Applied On The Surface Of Silicone Contact Lenses," Journal of Biomedical Materials Research, Vol. 22, 919-937 (1988), herein incorporated by reference in its entirety), a batch system (or a rotary plasma system) including a bell-shaped vacuum chamber in which opposing aluminum electrodes are disposed and a rotatable aluminum plate sits between the electrodes and is driven by an induction motor within the system. Matsuzawa and Winterton disclose in U.S. Pat. No. 6,881,269 (herein incorporated by reference in its entirety) a linear plasma system.

In accordance with the invention, the preformed silicone hydrogel contact lens in a dried state is treated with a plasma generated in a plasma gas (i.e., an atmosphere) compose of air, $N_2$, $O_2$, $CO_2$, or a mixture of a $C_1$-$C_6$ hydrocarbon and a secondary gas selected from the group consisting of air, $N_2$, $O_2$, $CO_2$, and combinations thereof (preferably air, $CO_2$, or a mixture of a $C_1$-$C_4$ hydrocarbon and a secondary gas selected from the group consisting of air, $CO_2$, $N_2$, and combinations thereof, more preferably $CO_2$ or a mixture of methane and a secondary gas selected from the group consisting of air, $CO_2$, $N_2$, and combinations thereof, even more preferably $CO_2$ or a mixture of methane and $CO_2$).

In accordance with the invention, the thickness of a prime plasma layer is from about 0.5 nm to about 40 nm, preferably from about 1 nm to about 35 nm, more preferably from about 2 nm to about 30 nm, even more preferably from about 3 nm to about 25 nm. A plasma coating with a thickness recited above can have minimally adverse impacts upon the oxygen permeability and ion permeability of a silicone hydrogel contact lens. The thickness of a plasma coating (layer) can be determined according to any know method. For example, it can be measured by ellipsometery on silicon wafers which are plasma-treated together with preformed silicone hydrogel contact lenses. A person knows how to control the plasma conditions (especially plasma treatment time) for obtaining a desired thickness of a particular prime plasma layer on a silicone hydrogel contact lens.

Where a plasma used in plasma treatment is generated in an atmosphere (i.e., plasma gas) composed of a mixture of a $C_1$-$C_6$ hydrocarbon and a secondary gas selected from the group consisting of air, $O_2$, $CO_2$, $N_2$, and combinations thereof, the composition of a plasma gas can be controlled by the flow rates (sccm) of each individual gases in the mixture. Preferably, the flow rate ratio of a $C_1$-$C_6$ hydrocarbon over the secondary gas (air, $O_2$, $CO_2$, $N_2$, or combinations thereof) is from about 1:4 to about 4:1.

In accordance with the invention, contacting of a plasma-treated silicone hydrogel contact lens with a first aqueous solution of a reactive hydrophilic polymer can occur by dipping it into the aqueous solution or by spraying it with the aqueous solution. One contacting process involves solely dipping the plasma-treated silicone hydrogel contact lens in a bath of a first aqueous solution for a period of time or alternatively dipping the plasma-treated silicone hydrogel contact lens sequentially in a series of bath of aqueous solutions for a fixed shorter time period for each bath. Another contacting process involves solely spray a first aqueous solution. However, a number of alternatives involve various combinations of spraying- and dipping-steps may be designed by a person having ordinary skill in the art. The contacting time can be from about 5 seconds to about 10 hours. A person knows how to control the contacting time for obtaining a desired thickness of a particular reactive polymer layer on a silicone hydrogel contact lens with a prime plasma layer thereon.

In a preferred embodiment, after being removed from the plasma treatment system, silicone hydrogel contact lenses are placed in contact with a first aqueous solution including a reactive hydrophilic polymer having multiple reactive functional groups selected from the group consisting of carboxyl groups, primary amine groups, secondary amine groups, and combinations thereof, within a time period of about 40 minutes or less (preferably about 30 minutes or less, more preferably about 20 minutes or less) immediately after the plasma-treatment sub-step and before contacting with water, an organic solvent, a mixture of water and one or more organic solvents, a mixture of two or more organic solvent, or any aqueous or organic-based solution free of any polymer. It is believed that there may be reactive radicals in a prime plasma layer on the surface of a plasma-treated silicone hydrogel contact lens. When a reactive polymer is present in a first aqueous solution for contacting a plasma-treated silicone hydrogel contact lens within 40 minutes immediately after plasma treatment, those free radicals may react with the reactive polymer to provide sufficient anchoring sites for covalently attaching a layer of the reactive polymer on the prime plasma layer, thereby enhancing the durability of the hydrogel coating to be formed in step (3). Preferably, the first aqueous solution comprises at least about 0.001% by weight (preferably from about 0.002% to about 20% by weight, more preferably from about 0.005% to about 15% by weight, even more preferably from about 0.01% to about 10% by weight) of a reactive hydrophilic polymer as defined above. Preferably, the reactive hydrophilic polymer comprises carboxyl groups.

It is found that a reactive base coating comprising a prime plasma layer and a reactive polymer layer can be advantageously used for forming a lubricious non-silicone hydrogel coating on a silicone hydrogel contact lens. Such a lubricious non-silicone hydrogel coating may have low susceptibility to deposition and accumulation of positively charged antimicrobials because of minimized concentration of carboxyl groups in the base coating. Further, the underlying prime plasma layer may provide the adequate hydrophilicity (or wettability) of the silicone hydrogel contact lens sufficient for ensuring its biocompatibility, even though it is not lubricious, in case if the non-silicone hydrogel coating would be damaged during the handling and wearing of the contact lens. In addition, this surface treatment may provide a platform for building a lubricious coating having a desired durability, e.g., lasting up to two days for daily-disposable lenses, lasting 7 to 35 days for weekly, biweekly or monthly disposable lenses.

In another preferred embodiment, the reactive hydrophilic polymer is a polyanionic polymer comprising carboxyl groups and having a weight average molecular weight of at least 1000 Daltons (preferably from 2000 to 5,000,000 Daltons, more preferably from 5000 to 2,000,000 Daltons, even more preferably from 10,000 to 1,000,000 Daltons), and the first aqueous solution preferably has a pH from about 1.0 to about 3.0 (more preferably from about 1.5 to about 2.5, even more preferably from about 1.8 to about 2.0). The polyanionic polymer is preferably a polyanionic polymer selected from the group consisting of polyacrylic acid, polymethacrylic acid, polyethylacrylic acid, poly(acrylic acid-co-methacrylic acid), poly(acrylic acid-co-ethacrylic acid), poly(methacrylic acid-co-ethacrylic acid), and a mixture thereof, more preferably a polyanionic polymer selected from the group consisting of polyacrylic acid, polymethacrylic acid, poly(acrylic acid-co-methacrylic acid), and a mixture thereof. It is believed that there may be some reactive functional groups including silanol groups (Si—OH) in the prime plasma layer on the surface of a plasma-treated silicone hydrogel contact lens. Schmidt reported that coupling reactions can occur between a carboxyl group and a free, unreacted silanol group at low pH (e.g., pH 2.0) according to an acid-catalyzed ester condensation mechanism (S. W. Schmidt, et al., Langmuir 2010, 26(19), 15333-15338, herein incorporated by reference in its entirety).

In another preferred embodiment, the reactive hydrophilic polymer is a polycationic polymer comprising primary and/or secondary amino groups and having a weight average molecular weight of at least 1000 Daltons (preferably from 2000 to 5,000,000 Daltons, more preferably from 5000 to 2,000,000 Daltons, even more preferably from 10,000 to 1,000,000 Daltons) and the first aqueous solution preferably has a pH from about 9.5 to about 11.0 (more preferably from about 10.0 to about 11.0). The polycationic polymer is preferably selected from the group consisting of polyethyleneimine, polyallylamine, polyvinylamine, polyamidoamine, and a mixture thereof.

In another preferred embodiment, the preformed silicone hydrogel contact lens is plasma-treated with a plasma generated in a plasma gas (i.e., an atmosphere) compose of $CO_2$ or a mixture of $CO_2$ and a $C_1$-$C_4$ hydrocarbon (preferably methane), followed by contacting the plasma-treated silicone hydrogel contact lens with a first aqueous solution of a reactive hydrophilic polymer comprising azetidinium groups and reactive functional groups selected from the group consisting of primary groups, secondary amino groups, carboxyl groups, and combinations thereof (preferably carboxyl groups), wherein the hydrophilic polymer has a weight average molecular weight of at least 1000 Daltons (preferably from 2000 to 5,000,000 Daltons, more preferably from 5000 to 2,000,000 Daltons, even more preferably from 10,000 to 1,000,000 Daltons) and the first aqueous solution preferably has a pH of less than about 8.0 (more preferably from about 2.0 to about 8.0, even more preferably from about 6.0 to about 8.0). In this preferred embodiment, the reactive hydrophilic polymer is preferably a chemically-modified poly(2-oxazoline-co-ethyleneimine)-epichlorohydrin, a chemically-modified polyamidoamine-epichlorohydrin, or combinations thereof. Preferably, the chemically-modified poly(2-oxazoline-co-ethyleneimine)-epichlorohydrin or the chemically-modified polyamidoamine-epichlorohydrin comprises (i) from about 20% to about 95% by weight of first polymer chains derived from a polyamidoamine-epichlorohydrin or a poly(2-oxazoline-co-ethyleneimine)-epichlorohydrin, (ii) from about 5% to about 80% by weight of hydrophilic moieties or second polymer chains derived from at least one hydrophilicity-enhancing agent having at least one reactive functional group selected from the group consisting of amino group, carboxyl group, thiol group, and combination thereof (preferably carboxyl groups), wherein the hydrophilic moieties or second polymer chains are covalently attached to the first polymer chains through one or more covalent linkages each formed between one azetitdinium group of the polyamidoamine-epichlorohydrin or the poly(2-oxazoline-co-ethyleneimine)-epichlorohydrin and one amino, carboxyl or thiol group of the hydrophilicity-enhancing agent, and (iii) azetidinium groups which are parts of the first polymer chains or pendant or terminal groups covalently attached to the first polymer chains. The composition of a chemically-modified poly(2-oxazoline-co-ethyleneimine)-epichlorohydrin or a chemically-modified polyamidoamine-epichlorohydrin is determined by the composition (based on the total weight of the reactants) of a reactants mixture used for such a polymer according to the crosslinking reactions shown in Scheme I Scheme I

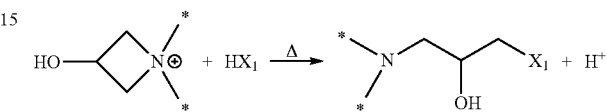

in which $X_1$ is —S—*, —OC(═O)—*, or —NR'—* in which R' is hydrogen or a $C_1$-$C_{20}$ unsubstituted or substituted alkyl group, and * represents an organic radical. For example, if a reactant mixture comprises about 75% by weight of a polyamidoamine-epichlorohydrin and about 25% by weight of at least one hydrophilicity-enhancing agent based on the total weight of the reactants, then the resultant chemically-modified polyamidoamine-epichlorohydrin comprises about 75% by weight of first polymer chains derived from the polyamioamine-epichlorohydrin and about 25% by weight of hydrophilic moieties or second polymer chains derived from said at least one hydrophilicity-enhancing agent. The azetidinium groups of the chemically-modified poly(2-oxazoline-co-ethyleneimine)-epichlorohydrin or the chemically-modified polyamidoamine-epichlorohydrin are those azetidinium groups (of the polyamidoamine-epichlorohydrin) which do not participate in crosslinking reactions for preparing the chemically-modified poly(2-oxazoline-co-ethyleneimine)-epichlorohydrin or the chemically-modified polyamidoamine-epichlorohydrin.

Any suitable hydrophilicity-enhancing agents can be used in the invention so long as they contain at least one amino group, at least one carboxyl group, and/or at least one thiol group.

A preferred class of hydrophilicity-enhancing agents include without limitation: primary amino-, secondary amino-, carboxyl- or thiol-containing monosaccharides (e.g., 3-amino-1,2-propanediol, 1-thiolglycerol, 5-keto-D-gluconic acid, galactosamine, glucosamine, galacturonic acid, gluconic acid, glucosaminic acid, mannosamine, saccharic acid 1,4-lactone, saccharide acid, Ketodeoxynonulosonic acid, N-methyl-D-glucamine, 1-amino-1-deoxy-β-D-galactose, 1-amino-1-deoxysorbitol, 1-methylamino-1-deoxysorbitol, N-aminoethyl gluconamide); primary amino-, secondary amino-, carboxyl- or thiol-containing disaccharides (e.g., chondroitin disaccharide sodium salt, di(β-D-xylopyranosyl)amine, digalacturonic acid, heparin disaccharide, hyaluronic acid disaccharide, Lactobionic acid); and primary amino-, secondary amino-, carboxyl- or thiol-containing oligosaccharides (e.g., carboxymethyl-β-cyclodextrin sodium salt, trigalacturonic acid); and combinations thereof.

Another preferred class of hydrophilicity-enhancing agents is hydrophilic polymers having one or more (primary or secondary) amino, carboxyl and/or thiol groups. More preferably, the content of the amino (—NHR' with R' as defined above), carboxyl (—COOH) and/or thiol (—SH) groups in a hydrophilic polymer as a hydrophilicity-enhancing agent is less than about 40%, preferably less than about 30%, more preferably less than about 20%, even more preferably less than about 10%, by weight based on the total weight of the hydrophilic polymer.

One preferred class of hydrophilic polymers as hydrophilicity-enhancing agents are (primary or secondary) amino- or carboxyl-containing polysaccharides, for example, such as, carboxymethylcellulose (having a carboxyl content of about 40% or less, which is estimated based on the composition of repeating units, $-[C_6H_{10-m}O_5(CH_2CO_2H)_m]$ in which m is 1 to 3), carboxyethylcellulose (having a carboxyl content of about 36% or less, which is estimated based on the composition of repeating units, $-[C_6H_{10-m}O_5(CH_2CO_2H)_m]$ in which m is 1 to 3) carboxypropylcellulose (having a carboxyl content of about 32% or less, which is estimated based on the composition of repeating units, $-[C_6H_{10-m}O_5(CH_2CO_2H)_m]$, in which m is 1 to 3), hyaluronic acid (having a carboxyl content of about 11%, which is estimated based on the composition of repeating units, $-(C_{13}H_{20}O_9NCO_2H)-$), chondroitin sulfate (having a carboxyl content of about 9.8%, which is estimated based on the composition of repeating units, $-(C_{12}H_{18}O_{13}NSCO_2H)-$), or combinations thereof.

Another preferred class of hydrophilic polymers as hydrophilicity-enhancing agents include without limitation: poly(ethylene glycol) (PEG) with mono-amino (primary or secondary amino), carboxyl or thiol group (e.g., PEG-NH$_2$, PEG-SH, PEG-COOH); H$_2$N-PEG-NH$_2$; HOOC-PEG-COOH; HS-PEG-SH; H$_2$N-PEG-COOH; HOOC-PEG-SH; H$_2$N-PEG-SH; multi-arm PEG with one or more amino (primary or secondary), carboxyl or thiol groups; PEG dendrimers with one or more amino (primary or secondary), carboxyl or thiol groups; a diamino-(primary or secondary) or dicarboxyl-terminated homo- or co-polymer of a non-reactive hydrophilic vinylic monomer; a monoamino- (primary or secondary) or monocarboxyl-terminated homo- or co-polymer of a non-reactive hydrophilic vinylic monomer; a copolymer which is a polymerization product of a composition comprising (1) about 60% by weight or less, preferably from about 0.1% to about 30%, more preferably from about 0.5% to about 20%, even more preferably from about 1% to about 15%, by weight of one or more reactive vinylic monomers and (2) at least one non-reactive hydrophilic vinylic monomer; and combinations thereof. Reactive vinylic monomer(s) and non-reactive hydrophilic vinylic monomer(s) are those described previously.

More preferably, a hydrophilic polymer as a hydrophilicity-enhancing agent is PEG-NH$_2$; PEG-SH; PEG-COOH; H$_2$N-PEG-NH$_2$; HOOC-PEG-COOH; HS-PEG-SH; H$_2$N-PEG-COOH; HOOC-PEG-SH; H$_2$N-PEG-SH; multi-arm PEG with one or more amino, carboxyl or thiol groups; PEG dendrimers with one or more amino, carboxyl or thiol groups; a monoamino-, monocarboxyl-, diamino- or dicarboxyl-terminated homo- or copolymer of a non-reactive hydrophilic vinylic monomer selected from the group consisting of acryamide (AAm), N,N-dimethylacrylamide (DMA), N-vinylpyrrolidone (NVP), N-vinyl-N-methyl acetamide, glycerol (meth)acrylate, hydroxyethyl (meth)acrylate, N-hydroxyethyl (meth)acrylamide, C$_1$-C$_4$-alkoxy polyethylene glycol (meth)acrylate having a weight average molecular weight of up to 400 Daltons, vinyl alcohol, N-methyl-3-methylene-2-pyrrolidone, 1-methyl-5-methylene-2-pyrrolidone, 5-methyl-3-methylene-2-pyrrolidone, N,N-dimethylaminoethyl (meth)acrylate, N,N-dimethylaminopropyl (metha)crylamide, (meth)acryloyloxyethyl phosphorylcholine, and combinations thereof; a copolymer which is a polymerization product of a composition comprising (1) from about 0.1% to about 30%, preferably from about 0.5% to about 20%, more preferably from about 1% to about 15%, by weight of acrylic acid, C$_1$-C$_3$ alkylacrylic acid, allylamine and/or amino-C$_2$-C$_4$ alkyl (meth)acrylate, and (2) at least one non-reactive hydrophilic vinylic monomer selected from the group consisting of acryamide, N,N-dimethylacrylamide, N-vinyl pyrrolidone, (meth)acryloyloxyethyl phosphorylcholine, N-vinyl-N-methyl acetamide, glycerol (meth)acrylate, hydroxyethyl (meth)acrylate, N-hydroxyethyl (meth)acrylamide, C$_1$-C$_4$-alkoxy polyethylene glycol (meth)acrylate having a weight average molecular weight of up to 400 Daltons, vinyl alcohol, and combination thereof.

Most preferably, the hydrophilicity-enhancing agent as a hydrophilicity-enhancing agent is PEG-NH$_2$; PEG-SH; PEG-COOH; monoamino-, monocarboxyl-, diamino- or dicarboxyl-terminated polyvinylpyrrolidone; monoamino-, monocarboxyl-, diamino- or dicarboxyl-terminated polyacrylamide; monoamino-, monocarboxyl-, diamino- or dicarboxyl-terminated poly(DMA); monoamino- or monocarboxyl-, diamino- or dicarboxyl-terminated poly(DMA-co-NVP); monoamino-, monocarboxyl-, diamino- or dicarboxyl-terminated poly(NVP-co-N,N-dimethylaminoethyl (meth)acrylate)); monoamino-, monocarboxyl-, diamino- or dicarboxyl-terminated poly(vinylalcohol); monoamino-, monocarboxyl-, diamino- or dicarboxyl-terminated poly[(meth)acryloyloxyethyl phosphrylcholine]homopolymer or copolymer; monoamino-, monocarboxyl-, diamino- or dicarboxyl-terminated poly(NVP-co-vinyl alcohol); monoamino-, monocarboxyl-, diamino- or dicarboxyl-terminated poly(DMA-co-vinyl alcohol); poly[(meth)acrylic acid-co-acrylamide] with from about 0.1% to about 30%, preferably from about 0.5% to about 20%, more preferably from about 1% to about 15%, by weight of (meth)acrylic acid; poly[(meth)acrylic acid-co-NVP) with from about 0.1% to about 30%, preferably from about 0.5% to about 20%, more preferably from about 1% to about 15%, by weight of (meth)acrylic acid; a copolymer which is a polymerization product of a composition comprising (1) (meth)acryloyloxyethyl phosphorylcholine and (2) from about 0.1% to about 30%, preferably from about 0.5% to about 20%, more preferably from about 1% to about 15%, by weight of acrylic acid, C$_1$-C$_3$ alkylacrylic acid, allylamine and/or amino-C$_2$-C$_4$alkyl (meth)acrylate; and combination thereof.

PEGs with functional groups and multi-arm PEGs with functional groups can be obtained from various commercial suppliers, e.g., Polyscience, and Shearwater Polymers, inc., etc.

Monoamino-, monocarboxyl-, diamino- or dicarboxyl-terminated homo- or copolymers of one or more non-reactive hydrophilic vinylic monomers or of a phosphorylcholine-containing vinylic monomer can be prepared according to procedures described in U.S. Pat. No. 6,218,508, herein incorporated by reference in its entirety. For example, to prepare a diamino- or dicarboxyl-terminated homo- or co-polymer of a non-reactive hydrophilic vinylic monomer, the non-reactive vinylic monomer, a chain transfer agent with an amino or carboxyl group (e.g., 2-aminoethanethiol, 2-mercaptopropinic acid, thioglycolic acid, thiolactic acid, or other hydroxymercaptanes, aminomercaptans, or carboxyl-containing mercaptanes) and optionally other vinylic monomer are copolymerized (thermally or actinically) with a reactive vinylic monomer (having an amino or carboxyl group), in the presence of an free-radical initiator. Generally, the molar ratio of chain transfer agent to that of all of vinylic monomers other than the reactive vinylic monomer is from about 1:5 to about 1:100, whereas the molar ratio of chain transfer agent to the reactive vinylic monomer is 1:1. In such preparation, the chain transfer agent with amino or carboxyl group is used to control the molecular weight of the resultant hydrophilic polymer and forms a terminal end of the resultant hydrophilic polymer so as to provide the resultant hydrophilic polymer with one terminal amino or carboxyl group, while the reactive vinylic monomer provides the other terminal carboxyl or amino group to the resultant hydrophilic polymer. Similarly, to prepare a monoamino- or monocarboxyl-terminated homo- or copolymer of a non-reactive hydrophilic vinylic monomer, the non-reactive vinylic monomer, a chain transfer agent with an amino or carboxyl group (e.g., 2-aminoethanethiol, 2-mercaptopropinic acid, thioglycolic acid, thiolactic acid, or other hydroxymercaptanes, aminomercaptans, or carboxyl-containing mercaptanes) and optionally other vinylic monomers are copolymerized (thermally or actinically) in the absence of any reactive vinylic monomer.

As used herein, a copolymer of a non-reactive hydrophilic vinylic monomer refers to a polymerization product of a non-reactive hydrophilic vinylic monomer with one or more additional vinylic monomers. Copolymers comprising a non-reactive hydrophilic vinylic monomer and a reactive vinylic monomer (e.g., a carboxyl-containing vinylic monomer, a primary amino group-containing vinylic monomer or a secondary amino group-containing vinylic monomer) can be prepared according to any well-known radical polymerization methods or obtained from commercial suppliers. Copolymers containing methacryloyloxyethyl phosphorylcholine and carboxyl-containing vinylic monomer (or amino-containing vinylic monomer) can be obtained from NOF Corporation (e.g., LIPIDURE®-A and -AF).

The weight average molecular weight $M_w$ of the hydrophilic polymer having at least one amino, carboxyl or thiol group (as a hydrophilicity-enhancing agent) is preferably from about 500 to about 1,000,000, more preferably from about 1,000 to about 500,000, even more preferably from about 5,000 to about 250,000 Daltons.

In accordance with the invention, the reaction between a hydrophilicity-enhancing agent and a poly(2-oxazoline-co-ethyleneimine)-epichlorohydrin copolymer (or a polyamidoamine-epichlorohydrin) is carried out at a temperature of from about 40° C. to about 80° C. for a period of time sufficient (from about 0.3 hour to about 24 hours, preferably from about 1 hour to about 12 hours, even more preferably from about 2 hours to about 8 hours) to form a chemically-modified poly(2-oxazoline-co-ethyleneimine)-epichlorohydrin or a chemically-modified polyamidoamine-epichlorohydrin.

In accordance with the invention, the concentration of a hydrophilicity-enhancing agent relative to a poly(2-oxazoline-co-ethyleneimine)-epichlorohydrin or a polyamidoamine-epichlorohydrin must be selected not to render a resultant hydrophilic polymeric material water-insoluble (i.e., a solubility of less than 0.005 g per 100 ml of water at room temperature) and not to consume more than about 99%, preferably about 98%, more preferably about 97%, even more preferably about 96% of the azetidinium groups of the poly(2-oxazoline-co-ethyleneimine)-epichlorohydrin or a polyamidoamine-epichlorohydrin.

In a preferred embodiment, a chemically-modified poly (2-oxazoline-co-ethyleneimine)-epichlorohydrin or a chemically-modified polyamidoamine-epichlorohydrin comprises: azetidinium groups; from about 20% to about 95%, preferably from about 35% to about 90%, more preferably from about 50% to about 85%, by weight of first polymer chains derived from a poly(2-oxazoline-co-ethyleneimine)-epichlorohydrin copolymer or a polyamidoamine-epichlorohydrin; and from about 5% to about 80%, preferably from about 10% to about 65%, even more preferably from about 15% to about 50%, by weight of hydrophilic moieties or second polymer chains derived from at least one hydrophilicity-enhancing agent having at least one reactive functional group selected from the group consisting of primary amino group, secondary amino group, carboxyl group, thiol group, and combination thereof.

In accordance with the invention, the silicone hydrogel contact lens with the base coating thereon is heated in a second aqueous solution which comprises a water-soluble and thermally-crosslinkable hydrophilic polymeric material having azetidinium groups and optionally (but preferably) amino or carboxyl groups, at a temperature of from about 60° C. to about 140° C. for a time period sufficient long to crosslink the water-soluble thermally-crosslinkable hydrophilic polymeric material and the base coating so as to form a hydrogel coating on the silicone hydrogel contact lens, wherein the hydrogel coating on the silicone hydrogel contact lens has a friction rating of 2 or less. It should be understood that the first aqueous solution and the second aqueous solution can be identical to or different from each other. A water-soluble and thermally-crosslinkable hydrophilic polymeric material used in step (3) is preferably a poly(2-oxazoline-co-ethyleneimine)-epichlorohydrin, a chemically-modified poly(2-oxazoline-co-ethyleneimine)-epichlorohydrin, a chemically-modified polyamidoamine-epichlorohydrin, or combinations thereof, wherein the chemically-modified poly(2-oxazoline-co-ethyleneimine)-epichlorohydrin or the chemically-modified polyamidoamine-epichlorohydrin comprises (i) from about 20% to about 95% by weight of first polymer chains derived from a polyamidoamine-epichlorohydrin or a poly(2-oxazoline-co-ethyleneimine)-epichlorohydrin, (ii) from about 5% to about 80% by weight of hydrophilic moieties or second polymer chains derived from at least one hydrophilicity-enhancing agent having at least one reactive functional group selected from the group consisting of amino group, carboxyl group, thiol group, and combination thereof, wherein the hydrophilic moieties or second polymer chains are covalently attached to the first polymer chains through one or more covalent linkages each formed between one azetitdinium group of the polyamidoamine-epichlorohydrin or the poly (2-oxazoline-co-ethyleneimine)-epichlorohydrin and one amino, carboxyl or thiol group of the hydrophilicity-enhancing agent, and (iii) azetidinium groups which are parts of the first polymer chains or pendant or terminal groups covalently attached to the first polymer chains. A water-soluble thermally crosslinkable hydrophilic polymeric material can have all of the embodiments and preferred embodiments of a poly(2-oxazoline-co-ethyleneimine)-epichlorohydrin, a chemically-modified poly(2-oxazoline-co-ethyleneimine)-epichlorohydrin, a chemically-modified polyamidoamine-epichlorohydrin, as described above for step (2)(b).

Preferably, the step of heating is performed by autoclaving the silicone hydrogel contact lens with a base coating thereon immersed in a packaging solution (i.e., a buffered aqueous solution) in a sealed lens package at a temperature of from about 115° C. to about 125° C. for approximately 20-90 minutes. In accordance with this embodiment of the invention, the packaging solution is a buffered aqueous solution which is ophthalmically safe after autoclave.

Lens packages (or containers) are well known to a person skilled in the art for autoclaving and storing a soft contact lens. Any lens packages can be used in the invention. Preferably, a lens package is a blister package which comprises a base and a cover, wherein the cover is detachably sealed to the base, wherein the base includes a cavity for receiving a sterile packaging solution and the contact lens.

Lenses are packaged in individual packages, sealed, and sterilized (e.g., by autoclave at about 120° C. or higher for at least 30 minutes under pressure) prior to dispensing to users. A person skilled in the art will understand well how to seal and sterilize lens packages.

In accordance with the invention, a packaging solution contains at least one buffering agent and one or more other ingredients known to a person skilled in the art. Examples of other ingredients include without limitation, tonicity agents, surfactants, antibacterial agents, preservatives, and lubricants (e.g., cellulose derivatives, polyvinyl alcohol, polyvinyl pyrrolidone).

The packaging solution contains a buffering agent in an amount sufficient to maintain a pH of the packaging solution in the desired range, for example, preferably in a physiologically acceptable range of about 6.5 to about 7.5. Any known, physiologically compatible buffering agents can be used. Suitable buffering agents as a constituent of the contact lens care composition according to the invention are known to the person skilled in the art. Examples are boric acid, borates, e.g. sodium borate, citric acid, citrates, e.g. potassium citrate, bicarbonates, e.g. sodium bicarbonate, TRIS (2-amino-2-hydroxymethyl-1,3-propanediol), Bis-Tris (Bis-(2-hydroxyethyl)-imino-tris-(hydroxymethyl)-methane), bis-aminopolyols, triethanolamine, ACES (N-(2-hydroxyethyl)-2-aminoethanesulfonic acid), BES (N,N-Bis(2-hydroxyethyl)-2-aminoethanesulfonic acid), HEPES (4-(2-hydroxyethyl)-1-piperazineethanesulfonic acid), MES (2-(N-morpholino)ethanesulfonic acid), MOPS (3-[N-morpholino]-propanesulfonic acid), PIPES (piperazine-N, N'-bis(2-ethanesulfonic acid), TES (N-[Tris(hydroxymethyl)methyl]-2-aminoethanesulfonic acid), salts thereof, phosphate buffers, e.g. $Na_2HPO_4$, $NaH_2PO_4$, and $KH_2PO_4$ or mixtures thereof. Preferably, the buffering agents are phosphate buffers, borate buffers, or combinations thereof. The amount of each buffer agent in a packaging solution is preferably from 0.001% to 2%, preferably from 0.01% to 1%; most preferably from about 0.05% to about 0.30% by weight.

The packaging solution has a tonicity of from about 200 to about 450 milliosmol (mOsm), preferably from about 250 to about 350 mOsm. The tonicity of a packaging solution can be adjusted by adding organic or inorganic substances which affect the tonicity. Suitable ocularly acceptable tonicity agents include, but are not limited to sodium chloride, potassium chloride, glycerol, propylene glycol, polyols, mannitols, sorbitol, xylitol and mixtures thereof.

A packaging solution of the invention has a viscosity of from about 1 centipoise to about 5 centipoises, at 25° C.

In a preferred embodiment, the packaging solution comprises preferably from about 0.01% to about 2%, more preferably from about 0.05% to about 1.5%, even more preferably from about 0.1% to about 1%, most preferably from about 0.2% to about 0.5%, by weight of a water-soluble thermally-crosslinkable hydrophilic polymeric material having azetidinium groups.

In another aspect, the invention provides a silicone hydrogel contact lens, which comprises: a silicone hydrogel substrate; a base coating on the surface of the silicone hydrogel substrate; a non-silicone hydrogel coating covalently attached onto the base coating, wherein the base coating comprises a prime plasma layer and a reactive polymer layer on top of the prime plasma layer, wherein the plasma prime layer has a thickness of from about 0.5 nm to about 40 nm (preferably from about 1 nm to about 35 nm, more preferably from about 2 nm to about 30 nm, even more preferably from about 3 nm to about 25 nm), wherein the reactive polymer comprises reactive functional groups selected from the group consisting of carboxyl groups, primary amino groups, secondary amino groups, and combinations thereof (preferably carboxyl groups), wherein the non-silicone hydrogel coating is covalently attached onto the reactive polymer layer through multiple reactive functional groups, wherein the silicone hydrogel contact lens in a fully-hydrated state has an oxygen permeability of at least about 40 barrers (preferably at least about 60 barrers, more preferably at least about 80 barrers, even more preferably at least about 100 barrers), a WBUT of at least about 10 seconds (preferably at least about 12.5 seconds, more preferably at least about 15 seconds, even more preferably at least about 17.5 seconds), a friction rating of about 3 or lower (preferably about 2.5 or lower, more preferably about 2 or lower, even more preferably about 1.5 or lower, most preferably about 1 or lower), and a water contact angle of about 80 degrees or less (preferably about 70 degrees or less, more preferably about 60 degrees or less, even more preferably about 50 degrees or less).

A silicone hydrogel contact lens of the invention, in a fully hydrated state, further has at least one property selected from the group consisting of: an elastic modulus of about 1.5 MPa or less (preferably from about 0.1 MPa to about 1.2 MPa or less, more preferably from about 0.15 MPa to about 1.1 or less, even more preferably from about 0.2 MPa to about 1.0 MPa); a water content of from about 15% to about 70%, preferably from about 20% to about 65%, more preferably from about 25% to about 60%, even more preferably from about 30% to about 55% by weight when fully hydrated; a coating durability characterized by surviving at least one cycle (preferably at least 7 cycles, more preferably at least 14 cycles, even more preferably at least 30 cycles) of digital rubbing test; and combinations thereof.

The water content of a silicone hydrogel contact lens can be measured according to Bulk Technique as disclosed in U.S. Pat. No. 5,849,811.

A silicone hydrogel substrate is a preformed silicone hydrogel contact lens. All the embodiments of a preformed silicone hydrogel contact lens described above are incorporated in this aspect of the invention.

Although various embodiments of the invention have been described using specific terms, devices, and methods, such description is for illustrative purposes only. The words used are words of description rather than of limitation. It is to be understood that changes and variations may be made by those skilled in the art without departing from the spirit or scope of the present invention, which is set forth in the following claims. In addition, it should be understood that aspects of the various embodiments may be interchanged either in whole or in part or can be combined in any manner and/or used together, as illustrated below:

1. A method for producing soft contact lenses, comprising the steps of:
   (1) obtaining a preformed silicone hydrogel contact lens in a dry state;
   (2) subjecting the preformed silicone hydrogel contact lens in the dry state to a surface treatment to obtain a silicone hydrogel contact lens with a base coating thereon, wherein the base coating comprises a prime plasma layer, a reactive polymer layer on top of the prime plasma layer, and reactive functional groups selected from the group consisting of carboxyl groups, primary amino groups, secondary amino groups, and combinations thereof, wherein the surface treatment comprises the sub-steps of
   (a) plasma-treating the surface of the preformed silicone hydrogel contact lens in the dry state with a plasma to obtain a silicone hydrogel contact lens with the prime plasma layer thereon, wherein the plasma is generated in a plasma gas (i.e., an atmosphere) composed of air, $N_2$, $O_2$, $CO_2$, or a mixture of a $C_1$-$C_6$ hydrocarbon and a secondary gas selected from the group consisting of air, $N_2$, $O_2$, $CO_2$, and combinations thereof, wherein the prime plasma layer has a thickness of from about 0.5 nm to about 40 nm, and
   (b) contacting the silicone hydrogel contact lens with the prime plasma layer thereon with a first aqueous solution including a reactive hydrophilic polymer having multiple reactive functional groups selected from the group consisting of carboxyl groups, primary amino groups, secondary amino groups, and combinations thereof to form the base coating which include the reactive polymer layer of the reactive hydrophilic polymer on top of the prime plasma layer; and
   (3) heating the silicone hydrogel contact lens with the base coating thereon obtained in step (2), in a second aqueous solution which comprises a water-soluble and thermally-crosslinkable hydrophilic polymeric material having azetidinium groups, at a temperature of from about 60° C. to about 140° C. for a time period sufficient long to crosslink the water-soluble thermally-crosslinkable hydrophilic polymeric material and the base coating so as to form a hydrogel coating on the silicone hydrogel contact lens, wherein the silicone hydrogel contact lens in fully hydrated state has a WBUT of at least about 10 seconds and a friction rating of about 3 or lower.
2. The method of invention 1, wherein the plasma gas is composed of air
3. The method of invention 1, wherein the plasma gas is composed of $N_2$.
4. The method of invention 1, wherein the plasma gas is composed of $O_2$.
5. The method of invention 1, wherein the plasma gas is composed of $CO_2$.
6. The method of invention 1, wherein the plasma gas is composed of a mixture of a $C_1$-$C_6$ hydrocarbon and a secondary gas selected from the group consisting of air, $N_2$, $O_2$, $CO_2$, and combinations thereof.
7. The method of invention 1, wherein the plasma gas is composed of air, $O_2$, $N_2$, $CO_2$, or a mixture of a $C_1$-$C_4$ hydrocarbon and a secondary gas selected from the group consisting of air, $O_2$, $CO_2$, $N_2$, and combinations thereof.
8. The method of invention 1, wherein the plasma gas is composed of air, $CO_2$, or a mixture of methane and a secondary gas selected from the group consisting of air, $CO_2$, $O_2$, $N_2$, and combinations thereof.
9. The method of invention 1, wherein the plasma gas is compose of $CO_2$, a mixture of methane and $CO_2$, or a mixture of methane and air (preferably $CO_2$ or a mixture of methane and $CO_2$).
10. The method of any one of inventions 1 to 9, wherein the prime plasma layer has a thickness of from about 1 nm to about 35 nm.
11. The method of any one of inventions 1 to 10, wherein the prime plasma layer has a thickness of from about 2 nm to about 30 nm.
12. The method of any one of inventions 1 to 11, wherein the prime plasma layer has a thickness of from about 3 nm to about 25 nm.
13. The method of any one of inventions 1 to 12, wherein the silicone hydrogel contact lens in fully hydrated state has a WBUT of at least about 12.5 seconds.
14. The method of any one of inventions 1 to 12, wherein the silicone hydrogel contact lens in fully hydrated state has a WBUT of at least about 15 seconds.
15. The method of any one of inventions 1 to 12, wherein the silicone hydrogel contact lens in fully hydrated state has a WBUT of at least about 17.5 seconds.
16. The method of any one of inventions 1 to 15, wherein the silicone hydrogel contact lens in fully hydrated state has a friction rating of about 2.5 or lower.
17. The method of any one of inventions 1 to 15, wherein the silicone hydrogel contact lens in fully hydrated state has a friction rating of about 2 or lower.
18. The method of any one of inventions 1 to 15, wherein the silicone hydrogel contact lens in fully hydrated state has a friction rating of about 1.5 or lower.
19. The method of any one of inventions 1 to 15, wherein the silicone hydrogel contact lens in fully hydrated state has a friction rating of about 1 or lower.
20. The method of any one of inventions 1 to 19, wherein the water-soluble and thermally-crosslinkable hydrophilic polymeric material further comprises primary groups, secondary amino groups, carboxyl groups, or combinations thereof.
21. The method of any one of inventions 1 to 20, wherein the plasma-treated silicone hydrogel contact lens is placed in contact with the first aqueous solution within a time period of about 40 minutes or less (preferably about 30 minutes or less, more preferably about 20 minutes or less) immediately after the plasma-treatment sub-step and before contacting with water, an organic solvent, a mixture of water and one or more organic solvents, a mixture of two or more organic solvent, or any aqueous or organic-based solution free of any reactive polymer.
22. The method of any one of inventions 1 to 21, wherein the first aqueous solution preferably has a pH from about 1.0 to about 3.0, and wherein the reactive hydrophilic polymer is a polyanionic polymer comprising carboxyl groups and having a weight average molecular weight of at least 1000 Daltons.
23. The method of invention 22, wherein the first aqueous solution preferably has a pH from about 1.5 to about 2.5.
24. The method of invention 22, wherein the first aqueous solution preferably has a pH from about 1.8 to about 2.0.
25. The method of any one of inventions 22 to 24, wherein the reactive hydrophilic polymer has a weight average molecular weight of from 2000 to 5,000,000 Daltons.
26. The method of any one of inventions 22 to 24, wherein the reactive hydrophilic polymer has a weight average molecular weight of from 5000 to 2,000,000 Daltons.
27. The method of any one of inventions 22 to 24, wherein the reactive hydrophilic polymer has a weight average molecular weight of from 10,000 to 1,000,000 Daltons.
28. The method of any one of inventions 22 to 27, wherein the polyanionic polymer is selected from the group consisting of polyacrylic acid, polymethacrylic acid, polyethylacrylic acid, poly(acrylic acid-co-methacrylic acid), poly(acrylic acid-co-ethacrylic acid), poly(methacrylic acid-co-ethacrylic acid), and a mixture thereof.

29. The method of any one of inventions 22 to 27, wherein the polyanionic polymer is selected from the group consisting of polyacrylic acid, polymethacrylic acid, poly (acrylic acid-co-methacrylic acid), and a mixture thereof.
30. The method of any one of inventions 1 to 21, wherein the first aqueous solution has a pH from about 9.5 to about 11.0, wherein the reactive hydrophilic polymer is a polycationic polymer comprising primary and/or secondary amino groups and having a weight average molecular weight of at least 1000 Daltons.
31. The method of invention 30, wherein the first aqueous solution has a pH from about 10.0 to about 11.0.
32. The method of invention 30 or 31, wherein the reactive hydrophilic polymer has a weight average molecular weight of from 2000 to 5,000,000 Daltons.
33. The method of invention 30 or 31, wherein the reactive hydrophilic polymer has a weight average molecular weight of from 5000 to 2,000,000 Daltons.
34. The method of invention 30 or 31, wherein the reactive hydrophilic polymer has a weight average molecular weight of from 10,000 to 1,000,000 Daltons.
35. The method of any one of inventions 30 to 34, wherein the polycationic polymer is selected from the group consisting of polyethyleneimine, polyallylamine, polyvinylamine, polyamidoamine, and a mixture thereof.
36. The method of any one of inventions 1 to 21, wherein the reactive hydrophilic polymer comprises azetidinium groups and reactive functional groups selected from the group consisting of primary groups, secondary amino groups, carboxyl groups, and combinations thereof, wherein the reactive hydrophilic polymer has a weight average molecular weight of at least 1000 Daltons, wherein the first aqueous solution preferably has a pH of less than about 8.0.
37. The method of invention 36, wherein the reactive hydrophilic polymer further comprises the azetidinium groups and the carboxyl groups.
38. The method of invention 36 or 37, wherein the reactive hydrophilic polymer has a weight average molecular weight of from 2000 to 5,000,000 Daltons.
39. The method of invention 36 or 37, wherein the reactive hydrophilic polymer has a weight average molecular weight of from 5000 to 2,000,000 Daltons.
40. The method of invention 36 or 37, wherein the reactive hydrophilic polymer has a weight average molecular weight of from 10,000 to 1,000,000 Daltons.
41. The method of any one of inventions 36 to 40, wherein the first aqueous solution preferably has a pH of from about 2.0 to about 8.0.
42. The method of any one of inventions 36 to 40, wherein the first aqueous solution preferably has a pH of from about 6.0 to about 8.0.
43. The method of any one of inventions 36 to 42, wherein the reactive hydrophilic polymer is a chemically-modified poly(2-oxazoline-co-ethyleneimine)-epichlorohydrin, a chemically-modified polyamidoamine-epichlorohydrin, or combinations thereof, wherein the chemically-modified poly(2-oxazoline-co-ethyleneimine)-epichlorohydrin or the chemically-modified polyamidoamine-epichlorohydrin comprises (i) from about 20% to about 95% by weight of first polymer chains of a polyamidoamine-epichlorohydrin or a poly(2-oxazoline-co-ethyleneimine)-epichlorohydrin, (ii) from about 5% to about 80% by weight of hydrophilic moieties or second polymer chains of at least one hydrophilicity-enhancing agent having at least two reactive functional groups selected from the group consisting of amino group, carboxyl group, and combination thereof, wherein the hydrophilic moieties or second polymer chains are covalently attached to the first polymer chains through one or more covalent linkages each formed between one azetitdinium group of the polyamidoamine-epichlorohydrin or the poly(2-oxazoline-co-ethyleneimine)-epichlorohydrin and one amino, carboxyl or thiol group of the hydrophilicity-enhancing agent, and (iii) azetidinium groups which are parts of the first polymer chains or pendant or terminal groups covalently attached to the first polymer chains.
44. The method of any one of inventions 1 to 43, wherein the water-soluble thermally crosslinkable hydrophilic polymeric material is a poly(2-oxazoline-co-ethyleneimine)-epichlorohydrin, a chemically-modified poly(2-oxazoline-co-ethyleneimine)-epichlorohydrin, a chemically-modified polyamidoamine-epichlorohydrin, or combinations thereof, wherein the chemically-modified poly(2-oxazoline-co-ethyleneimine)-epichlorohydrin or the chemically-modified polyamidoamine-epichlorohydrin comprises (i) from about 20% to about 95% by weight of first polymer chains of a polyamidoamine-epichlorohydrin or a poly(2-oxazoline-co-ethyleneimine)-epichlorohydrin, (ii) from about 5% to about 80% by weight of hydrophilic moieties or second polymer chains of at least one hydrophilicity-enhancing agent having at least one reactive functional group selected from the group consisting of amino group, carboxyl group, thiol group, and combination thereof, wherein the hydrophilic moieties or second polymer chains are covalently attached to the first polymer chains through one or more covalent linkages each formed between one azetitdinium group of the polyamidoamine-epichlorohydrin or the poly(2-oxazoline-co-ethyleneimine)-epichlorohydrin and one amino, carboxyl or thiol group of the hydrophilicity-enhancing agent, and (iii) azetidinium groups which are parts of the first polymer chains or pendant or terminal groups covalently attached to the first polymer chains.
45. The method of any one of inventions 1 to 43, wherein the water-soluble thermally crosslinkable hydrophilic polymeric material is a chemically-modified poly(2-oxazoline-co-ethyleneimine)-epichlorohydrin or a chemically-modified polyamidoamine-epichlorohydrin, wherein the chemically-modified poly(2-oxazoline-co-ethyleneimine)-epichlorohydrin and the chemically-modified polyamidoamine-epichlorohydrin independently of each other comprise:

(i) from about 20% to about 95% by weight of first polymer chains of a polyamidoamine-epichlorohydrin or a poly(2-oxazoline-co-ethyleneimine)-epichlorohydrin;

(ii) from about 5% to about 80% by weight of hydrophilic moieties or second polymer chains of at least one hydrophilicity-enhancing agent having at least one reactive functional group selected from the group consisting of amino group, carboxyl group, thiol group, and combination thereof; and (iii) positively-charged azetidinium groups which are parts of the first polymer chains or pendant or terminal groups covalently attached to the first polymer chains, wherein the hydrophilic moieties or second polymer chains are covalently attached to the first polymer chains through one or more covalent linkages each formed between one azetitdinium group of the polyamidoamine-epichlorohydrin or the poly(2-oxazoline-co-ethyleneimine)-epichlorohydrin and one amino, carboxyl or thiol group of the hydrophilicity-enhancing agent.

46. The method of invention 45, wherein the chemically-modified poly(2-oxazoline-co-ethyleneimine)-epichlorohydrin and the chemically-modified polyamidoamine-epichlorohydrin independently of each other comprise from about 35% to about 90% by weight of the first polymer chains and from about 10% to about 65% by weight of the hydrophilic moieties or the second polymer chains.

47. The method of invention 45, wherein the chemically-modified poly(2-oxazoline-co-ethyleneimine)-epichlorohydrin and the chemically-modified polyamidoamine-epichlorohydrin independently of each other comprise from about 50% to about 85% by weight of the first polymer chains and from about 15% to about 50% by weight of the hydrophilic moieties or the second polymer chains.

48. The method of any one of inventions 45 to 47, wherein the hydrophilicity-enhancing agent is a hydrophilic polymer having one or more amino, carboxyl and/or thiol groups, wherein the content of the amino, carboxyl and/or thiol groups in the hydrophilic polymer as the hydrophilicity-enhancing agent is less than about 40% by weight based on the total weight of the hydrophilic polymer.

49. The method of any one of inventions 45 to 47, wherein the hydrophilicity-enhancing agent is a hydrophilic polymer having one or more amino, carboxyl and/or thiol groups, wherein the content of the amino, carboxyl and/or thiol groups in the hydrophilic polymer as the hydrophilicity-enhancing agent is less than about 30% by weight based on the total weight of the hydrophilic polymer.

50. The method of any one of inventions 45 to 47, wherein the hydrophilicity-enhancing agent is a hydrophilic polymer having one or more amino, carboxyl and/or thiol groups, wherein the content of the amino, carboxyl and/or thiol groups in the hydrophilic polymer as the hydrophilicity-enhancing agent is less than about 20% by weight based on the total weight of the hydrophilic polymer.

51. The method of any one of inventions 45 to 47, wherein the hydrophilicity-enhancing agent is a hydrophilic polymer having one or more amino, carboxyl and/or thiol groups, wherein the content of the amino, carboxyl and/or thiol groups in the hydrophilic polymer as the hydrophilicity-enhancing agent is less than about 10% by weight based on the total weight of the hydrophilic polymer.

52. The method of any one of inventions 45 to 51, wherein the hydrophilicity-enhancing agent is: $PEG-NH_2$; PEG-SH; PEG-COOH; $H_2N-PEG-NH_2$; HOOC-PEG-COOH; HS-PEG-SH; $H_2N-PEG-COOH$; HOOC-PEG-SH; $H_2N-PEG-SH$; multi-arm PEG with one or more amino, carboxyl or thiol groups; PEG dendrimers with one or more amino, carboxyl or thiol groups; a diamino-, dicarboxyl-, monoamino- or monocarboxyl-terminated homo- or co-polymer of a non-reactive hydrophilic vinylic monomer; or combinations thereof, wherein PEG is a polyethylene glycol segment, wherein the non-reactive vinylic monomer is selected from the group consisting of acrylamide, methacrylamide, N,N-dimethylacrylamide, N,N-dimethylmethacrylamide, N-vinylpyrrolidone, N,N,-dimethylaminoethylmethacrylate, N,N-dimethylaminoethylacrylate, N,N-dimethylaminopropyl-methacrylamide, N,N-dimethylaminopropylacrylamide, glycerol methacrylate, 3-acryloylamino-1-propanol, N-hydroxyethyl acrylamide, N-[tris(hydroxymethyl)methyl]-acrylamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 2-hydroxyethyl (meth)acrylate, hydroxypropyl (meth)acrylate, a phosphorylcholine-containing vinylic monomer, $C_1$-$C_4$-alkoxy polyethylene glycol (meth)acrylate having a weight average molecular weight of up to 1500 Daltons, N-vinyl formamide, N-vinyl acetamide, N-vinyl isopropylamide, N-vinyl-N-methyl acetamide, allyl alcohol, vinyl alcohol, or combinations thereof.

53. The method of any one of inventions 45 to 51, wherein the hydrophilicity-enhancing agent is a copolymer of (1) at least one reactive vinylic monomer and (2) at least one non-reactive hydrophilic vinylic monomer, wherein the reactive vinylic monomer is present in the copolymer in an amount of about 60% or less by weight, wherein the reactive vinylic monomer is selected from the group consisting of amino-$C_1$-$C_6$ alkyl (meth)acrylate, $C_1$-$C_6$ alkylamino-$C_1$-$C_6$ alkyl (meth)acrylate, allylamine, vinylamine, amino-$C_1$-$C_6$ alkyl (meth)acrylamide, $C_1$-$C_6$ alkylamino-$C_1$-$C_6$ alkyl (meth)acrylamide, acrylic acid, $C_1$-$C_4$ alkylacrylic acid, N,N-2-acrylamidoglycolic acid, beta-methyl-acrylic acid, alpha-phenyl acrylic acid, beta-acryloxy propionic acid, sorbic acid, angelic acid, cinnamic acid, 1-carobxy-4-phenyl butadiene-1,3, itaconic acid, citraconic acid, mesaconic acid, glutaconic acid, aconitic acid, maleic acid, fumaric acid, tricarboxy ethylene, and combinations thereof;

wherein the non-reactive vinylic monomer is selected from the group consisting of acrylamide, methacrylamide, N,N-dimethylacrylamide, N,N-dimethylmethacrylamide, N-vinylpyrrolidone, N,N,-dimethylaminoethylmethacrylate, N,N-dimethylaminoethylacrylate, N,N-dimethylaminopropylmethacrylamide, N,N-dimethylaminopropylacrylamide, glycerol methacrylate, 3-acryloylamino-1-propanol, N-hydroxyethyl acrylamide, N-[tris(hydroxymethyl)methyl]-acrylamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 2-hydroxyethyl (meth)acrylate, hydroxypropyl (meth)acrylate, a phosphorylcholine-containing vinylic monomer, $C_1$-$C_4$-alkoxy polyethylene glycol (meth)acrylate having a weight average molecular weight of up to 1500 Daltons, N-vinyl formamide, N-vinyl acetamide, N-vinyl isopropylamide, N-vinyl-N-methyl acetamide, allyl alcohol, vinyl alcohol, and combinations thereof.

54. The method of invention 53, wherein the reactive vinylic monomer is present in the copolymer in an amount of from about 0.1% to about 30% by weight.

55. The method of invention 53, wherein the reactive vinylic monomer is present in the copolymer in an amount of from about 0.5% to about 20% by weight.

56. The method of invention 53, wherein the reactive vinylic monomer is present in the copolymer in an amount of from about 1% to about 15% by weight.

57. The method of any one of inventions 54 to 56, wherein the reactive vinylic monomer is acrylic acid.

58. The method of any one of inventions 54 to 56, wherein the reactive vinylic monomer is aminoethylacrylate, aminoethylmethacrylate, aminopropylacrylate, aminopropylmethacrylate, $C_1$-$C_2$ alkylaminoethylacrylate, $C_1$-$C_2$ alkylaminoethylmethacrylate, $C_1$-$C_2$ alkylaminopropylacrylate, $C_1$-$C_2$ alkylaminopropylmethacrylate, aminoethylacrylamide, aminoethylmethacrylamide, aminopropylacrylamide, aminopropylmethacrylamide, $C_1$-$C_2$ alkylaminoethylacrylamide, $C_1$-$C_2$ alkylaminoethylmethacrylamide, $C_1$-$C_2$ alkylaminopropylacrylamide, $C_1$-$C_2$ alkylaminopropylmethacrylamide, or combinations thereof.

59. The method of any one of inventions 54 to 58, wherein the non-reactive vinylic monomer is acrylamide.

60. The method of any one of inventions 54 to 58, wherein the non-reactive vinylic monomer is a phosphorylcholine-containing vinylic monomer.

61. The method of any one of inventions 54 to 58, wherein the non-reactive vinylic monomer is N,N-dimethylacrylamide, N-vinylpyrrolidone, N-vinylacetamide, N-vinyl-N-methyl acetamide, or combinations thereof.

62. The method of any one of inventions 45 to 51, wherein the hydrophilicity-enhancing agent is an amino- or carboxyl-containing polysaccharide, hyaluronic acid, chondroitin sulfate, and combinations thereof.

63. The method of any one of inventions 45 to 62, wherein the weight average molecular weight $M_w$ of the hydrophilicity-enhancing agent is from about 500 to about 1,000,000 Daltons.

64. The method of any one of inventions 45 to 62, wherein the weight average molecular weight $M_w$ of the hydrophilicity-enhancing agent is from about 1,000 to about 500,000 Daltons.

65. The method of any one of inventions 45 to 62, wherein the weight average molecular weight $M_w$ of the hydrophilicity-enhancing agent is from about 5,000 to about 250,000 Daltons.

66. The method of any one of inventions 45 to 47, wherein the hydrophilicity-enhancing agent is: amino-, carboxyl- or thiol-containing monosaccharides; amino-, carboxyl- or thiol-containing disaccharides; and amino-, carboxyl- or thiol-containing oligosaccharides.

67. The method of any one of inventions 45 to 66, wherein the first polymer chains are derived from the polyamidoamine-epichlorohydrin.

68. The method of any one of inventions 45 to 66, wherein the first polymer chains are derived from the poly(2-oxazoline-co-ethyleneimine)-epichlorohydrin.

69. The method of any one of inventions 1 to 68, wherein the step of heating is carried out directly in a sealed lens package containing a packaging solution including the water-soluble and thermally-crosslinkable hydrophilic polymeric material during sterilization by autoclave at a temperature from about 115° C. to about 125° C. for at least about 20 minutes under pressure; wherein the packaging solution comprises from about 0.01% to about 2% by weight of the water-soluble and thermally-crosslinkable hydrophilic polymeric material; wherein the packaging solution comprises at least one buffering agent in an amount sufficient to maintain a pH of from about 6.0 to about 8.5 and has a tonicity of from about 200 to about 450 milliosmol (mOsm), and a viscosity of from about 1 centipoise to about 5 centipoises, at 25° C.

70. A silicone hydrogel contact lens, comprising:
a silicone hydrogel substrate;
a base coating on the surface of the silicone hydrogel substrate, wherein the base coating comprises a prime plasma layer and a reactive polymer layer on top of the prime plasma layer, wherein the plasma prime layer has a thickness of from about 0.5 nm to about 40 nm, wherein the reactive polymer comprises reactive functional groups selected from the group consisting of carboxyl groups, primary amino groups, secondary amino groups, and combinations thereof; and
a non-silicone hydrogel coating covalently attached onto the base coating, wherein the non-silicone hydrogel coating is covalently attached onto the reactive polymer layer through multiple reactive functional groups,
wherein the silicone hydrogel contact lens in a fully-hydrated state has an oxygen permeability of at least about 40 barrers, a WBUT of at least about 10 seconds, a friction rating of about 3 or lower, and a water contact angle of about 80 degrees or less.

71. The silicone hydrogel contact lens of invention 70, wherein the plasma prime layer has a thickness of from about 1 nm to about 35 nm.

72. The silicone hydrogel contact lens of invention 70, wherein the plasma prime layer has a thickness of from about 2 nm to about 30 nm.

73. The silicone hydrogel contact lens of invention 70, wherein the plasma prime layer has a thickness of from about 3 nm to about 25 nm.

74. The silicone hydrogel contact lens of any one of inventions 70 to 73, wherein the reactive polymer comprises carboxyl groups.

75. The silicone hydrogel contact lens of any one of inventions 70 to 73, wherein the silicone hydrogel contact lens in a fully-hydrated state has an oxygen permeability of at least about 60 barrers.

76. The silicone hydrogel contact lens of any one of inventions 70 to 73, wherein the silicone hydrogel contact lens in a fully-hydrated state has an oxygen permeability of at least about 80 barrers.

77. The silicone hydrogel contact lens of any one of inventions 70 to 73, wherein the silicone hydrogel contact lens in a fully-hydrated state has an oxygen permeability of at least about 100 barrers.

78. The silicone hydrogel contact lens of any one of inventions 70 to 77, wherein the silicone hydrogel contact lens in a fully-hydrated state has a WBUT of at least about 12.5 seconds.

79. The silicone hydrogel contact lens of any one of inventions 70 to 77, wherein the silicone hydrogel contact lens in a fully-hydrated state has a WBUT of at least about 15 seconds.

80. The silicone hydrogel contact lens of any one of inventions 70 to 77, wherein the silicone hydrogel contact lens in a fully-hydrated state has a WBUT of at least about 17.5 seconds.

81. The silicone hydrogel contact lens of any one of inventions 70 to 80, wherein the silicone hydrogel contact lens in a fully-hydrated state has a friction rating of about 2.5 or lower.

82. The silicone hydrogel contact lens of any one of inventions 70 to 80, wherein the silicone hydrogel contact lens in a fully-hydrated state has a friction rating of about 2 or lower.

83. The silicone hydrogel contact lens of any one of inventions 70 to 80, wherein the silicone hydrogel contact lens in a fully-hydrated state has a friction rating of about 1.5 or lower.

84. The silicone hydrogel contact lens of any one of inventions 70 to 80, wherein the silicone hydrogel contact lens in a fully-hydrated state has a friction rating of about 1 or lower.

85. The silicone hydrogel contact lens of any one of inventions 70 to 84, wherein the silicone hydrogel contact lens in a fully-hydrated state has a water contact angle of about 70 degrees or less.

86. The silicone hydrogel contact lens of any one of inventions 70 to 84, wherein the silicone hydrogel contact lens in a fully-hydrated state has a water contact angle of about 60 degrees or less.

87. The silicone hydrogel contact lens of any one of inventions 70 to 84, wherein the silicone hydrogel contact lens in a fully-hydrated state has a water contact angle of about 50 degrees or less.
88. The silicone hydrogel contact lens of any one of inventions 70 to 87, wherein the silicone hydrogel contact lens in a fully hydrated state further has an elastic modulus of about 1.5 MPa or less.
89. The silicone hydrogel contact lens of any one of inventions 70 to 87, wherein the silicone hydrogel contact lens in a fully hydrated state further has an elastic modulus of from about 0.1 MPa to about 1.2 MPa or less.
90. The silicone hydrogel contact lens of any one of inventions 70 to 87, wherein the silicone hydrogel contact lens in a fully hydrated state further has an elastic modulus of from about 0.15 MPa to about 1.1 or less.
91. The silicone hydrogel contact lens of any one of inventions 70 to 87, wherein the silicone hydrogel contact lens in a fully hydrated state further has an elastic modulus of from about 0.2 MPa to about 1.0 MPa.
92. The silicone hydrogel contact lens of any one of inventions 70 to 91, wherein the silicone hydrogel contact lens has a water content of from about 15% to about 70% by weight when fully hydrated.
93. The silicone hydrogel contact lens of any one of inventions 70 to 91, wherein the silicone hydrogel contact lens has a water content of from about 20% to about 65% by weight when fully hydrated.
94. The silicone hydrogel contact lens of any one of inventions 70 to 91, wherein the silicone hydrogel contact lens has a water content of from about 25% to about 60% by weight when fully hydrated.
95. The silicone hydrogel contact lens of any one of inventions 70 to 91, wherein the silicone hydrogel contact lens has a water content of from about 30% to about 55% by weight when fully hydrated.
96. The silicone hydrogel contact lens of any one of inventions 70 to 95, wherein the silicone hydrogel contact lens in a fully hydrated state further has a coating durability characterized by surviving at least one cycle of digital rubbing tests.
97. The silicone hydrogel contact lens of any one of inventions 70 to 95, wherein the silicone hydrogel contact lens in a fully hydrated state further has a coating durability characterized by surviving at least 7 cycles of digital rubbing tests.
98. The silicone hydrogel contact lens of any one of inventions 70 to 95, wherein the silicone hydrogel contact lens in a fully hydrated state further has a coating durability characterized by surviving at least 14 cycles of digital rubbing tests.
99. The silicone hydrogel contact lens of any one of inventions 70 to 95, wherein the silicone hydrogel contact lens in a fully hydrated state further has a coating durability characterized by surviving at least 30 cycles of digital rubbing tests.
100. The silicone hydrogel contact lens of any one of inventions 70 to 95, wherein the silicone hydrogel contact lens in a fully hydrated state further has a coating durability characterized by surviving at least 60 cycles of digital rubbing tests.

The previous disclosure will enable one having ordinary skill in the art to practice the invention. Various modifications, variations, and combinations can be made to the various embodiment described herein. In order to better enable the reader to understand specific embodiments and the advantages thereof, reference to the following examples is suggested. It is intended that the specification and examples be considered as exemplary.

EXAMPLE 1

Oxygen Permeability Measurements

The apparent oxygen permeability ($Dk_{app}$), the apparent oxygen transmissibility (Dk/t), the intrinsic (or edge-corrected) oxygen permeability ($Dk_c$) of a lens and a lens material are determined according to procedures described in Example 1 of U.S. patent application publication No. 2012/0026457 A1 (herein incorporated by reference in its entirety).

Digital Rubbing Tests.

The lenses are digitally rubbed (wearing disposable powder-free latex gloves) with RENU® multi-purpose lens care solution (or another multi-purpose lens care solution) for 20 seconds and then rinsed with saline. The above procedure is repeated for a given times, e.g., from 1 to 30 times, (i.e., number of repetitions of digital rubbing tests which imitate cleaning and soaking cycles).

Lubricity Evaluation.

The lubricity of a lens is evaluated by using a finger-felt lubricity test which characterizes qualitatively the slipperiness of a lens surface on a friction rating scale of from 0 to 4. The higher the friction rating is, the lower the slipperiness (or lubricity).

Commercial lenses: DAILIES® TOTAL1®; ACUVUE® OASYS™; ACUVUE® ADVANCE PLUS™; DAILIES® Aqua Comfort Plus®; and AIR OPTIX®, are assigned a friction rating (designated "FR" hereinafter) of 0, 1, 2, 3, and 4 respectively. They are used as standard lenses for determining the friction rating of a lens under test.

The samples are placed in PBS for at least two rinses of 30 minutes each and then transferred to fresh PBS before the evaluation. Before the evaluation, hands are rinsed with a soap solution, extensively rinsed with DI water and then dried with KimWipe® towels. The samples are handled between the fingers and a numerical number is assigned for each sample relative to the above standard lenses described above. For example, if lenses are determined to be only slightly better than AIR OPTIX® lenses, then they are assigned a number 3. The value of a friction rating is one obtained by averaging the results of at least two friction ratings of a contact lens by two or more persons and/or by averaging the friction ratings of two or more contact lenses (from the identical batch of lens production) by one person.

Surface Wettability Tests.

Water contact angle (WCA) on a contact lens is a general measure of the surface wettability of a contact lens. In particular, a low water contact angle corresponds to more wettable surface. Average contact angles (Sessile Drop) of contact lenses are measured using a VCA 2500 XE contact angle measurement device from AST, Inc., located in Boston, Mass. This equipment is capable of measuring advancing contact angles ($\theta_a$) or receding contact angles ($\theta_r$) or sessile (static) contact angles. Unless specified, water contact angle is sessile (static) contact angle. The measurements are performed on fully hydrated contact lenses and immediately after blot-drying as follows. A contact lens is removed from the vial and washed 3 times in ~200 ml of fresh DI water in order to remove loosely bound packaging additives from the lens surface. The lens is then placed on top of a lint-free clean cloth (Alpha Wpe TX1009), dabbed well to remove surface water, mounted on the contact angle measurement pedestal, blown dry with a blast of dry air and finally the sessile drop contact angle is automatically measured using the software provided by the manufacturer. The DI water used for measuring the contact angle has a resistivity >18MΩcm and the droplet volume used is 41. Typically, uncoated silicone hydrogel lenses (after autoclave) have a sessile drop contact angle around 120 degrees. The tweezers and the pedestal are washed well with Isopropanol and rinsed with DI water before coming in contact with the contact lenses.

Water Break-Up Time (WBUT) Tests.

The surface hydrophilicity of lenses (after autoclave) is assessed by determining the time required for the water film to start breaking on the lens surface. Briefly, lenses are removed from the vial and placed in PBS (phosphate buffered saline) for at least two rinses of 30 minutes each and then transferred to fresh PBS in order to remove loosely bound packaging additives from the lens surface. The lens is removed from the solution and held against a bright light source. The time that is needed for the water film to break (de-wet) exposing the underlying lens material is noted visually. Uncoated lenses typically instantly break upon removal from PBS and are assigned a WBUT of 0 seconds. Lenses exhibiting WBUT 10 seconds are considered to have a hydrophilic surface and are expected to exhibit adequate wettability (ability to support the tear film) on-eye.

X-Ray Photoelectron Spectrophotometer (XPS) Tests.

This analytical technique uses x-rays to excite the electrons associated with the atoms at the lens surface. Then collects a portion of the energy emitted by the excited electrons through which analytical information is derived and used to determine the chemical concentrations of elements found at the surface.

XPS is carried out using Sage HR100 spectrometer using a Mg K-alpha XR-50 broad X-ray source (10 kV, 100 W) and a 100 mm PHOIBOS analyzer.

PHMB Uptake Test.

The preservative polyhexamethylene biguanide hydrochloride (PHMB HCl) in solution is measured by the method of High Performance Liquid Chromatography (HPLC). This method may be used specifically for the analysis of PHMB at low ppm levels in Optifree Replenish, Renu fresh multi-purpose, PureMoist and in citrate buffered release solutions.

The PHMB test is carried out using the instrument of Waters H-Class UPLC with Dionex Corona Ultra RS UHPLC detector, with HPLC Columnof Jupiter Wdepore 300A C18. To prepare uptake test sample, one lens will be soaked in 5.0 ml Renu Fresh, in 30 ml PP bottle, for 24 hours at room temperature. The difference of HPLC tests between uptake solution and control Renu solution indicates the PHMB uptake per lens (μg/lens).

Plasma Coating Thickness Test.

The plasma coating thickness in Angstrom)(A° is obtained by measuring the thickness increase on silicon wafer after they have been coated using the Plasma Polymerization Coating Machines. The instrument for the thickness measurement is Sentech Ellipsometer SE400 Advanced. It is a precision optical instrument which measures changes in the state of polarized light reflected from the surface of samples, by determining the azimuth of a rotatable polarized prism in the incident beam and the azimuth of a rotatable analyzer prism in the reflected beam for which the intensity of the reflected beam (after passage through the analyzer prism) is a minimum.

EXAMPLE 2

Synthesis of Macromers

Macromers are synthesized according to the procedures similar to those described in Example B-1 to B-4 of U.S. Pat. No. 5,849,811.

51.5 g (50 mmol) of the perfluoropolyether Fomblin® ZDOL (from Ausimont S.p.A, Milan) having a mean molecular weight of 1030 g/mol and containing 1.96 meq/g of hydroxyl groups according to end-group titration is introduced into a three-neck flask together with 50 mg of dibutyltin dilaurate. The flask contents are evacuated to about 20 mbar with stirring and subsequently decompressed with argon. This operation is repeated twice. 22.2 g (0.1 mol) of freshly distilled isophorone diisocyanate kept under argon are subsequently added in a counterstream of argon. The temperature in the flask is kept below 30° C. by cooling with a waterbath. After stirring overnight at room temperature, the reaction is complete. Isocyanate titration gives an NCO content of 1.40 meq/g (theory: 1.35 meq/g).

202 g of the α,ω-hydroxypropyl-terminated polydimethylsiloxane KF-6001 from Shin-Etsu having a mean molecular weight of 2000 g/mol (1.00 meq/g of hydroxyl groups according to titration) are introduced into a flask. The flask contents are evacuated to approx. 0.1 mbar and decompressed with argon. This operation is repeated twice. The degassed siloxane is dissolved in 202 ml of freshly distilled toluene kept under argon, and 100 mg of dibutyltin dilaurate (DBTDL) are added. After complete homogenization of the solution, all the perfluoropolyether reacted with isophorone diisocyanate (IPDI) is added under argon. After stirring overnight at room temperature, the reaction is complete. The solvent is stripped off under a high vacuum at room temperature. Microtitration shows 0.36 meq/g of hydroxyl groups (theory 0.37 meq/g).

13.78 g (88.9 mmol) of 2-isocyanatoethyl methacrylate (IEM) are added under argon to 247 g of the α,σ-hydroxypropyl-terminated polysiloxane-perfluoropolyether-polysiloxane three-block copolymer (a three-block copolymer on stoichiometric average, but other block lengths are also present). The mixture is stirred at room temperature for three days. Microtitration then no longer shows any isocyanate groups (detection limit 0.01 meq/g). 0.34 meq/g of methacryl groups is found (theory 0.34 meq/g).

The macromer prepared in this way is completely colorless and clear. It can be stored in air at room temperature for several months in the absence of light without any change in molecular weight.

Production of Contact Lenses 25.92 g of the macromer prepared from procedure (a) are added to a clean container. 19.25 g of 3-tris(trimethylsiloxy) silylpropyl methacrylate (TRIS from Shin-Etsu, product No. KF-2801) are added, followed by 1.00 gm of photoinitiator Darocur® 1173 (Ciba). 28.88 g dimethylacrylamide (DMA) are added, followed by 24.95 g of ethanol. After complete homogenization of the solution, this solution is filtered through a Teflon membrane having a pore width of 0.5 microns under nitrogen or air pressure. This solution is then pipetted into dust-free contact-lens molds made from polypropylene. The molds are closed, and the polymerization reaction is effected by UV irradiation (5.0 mW/cm$^2$, 30 min.), with simultaneous crosslinking. The molds are then opened and placed in isopropanol, causing the resultant lenses to swell out of the molds. The lenses are extracted for 4 hours minimum with 100% isopropyl alcohol before being placed into water. The resultant silicone hydrogel contact lenses have the following properties: water content (33±2%); intrinsic (or edge-corrected) oxygen permeability $Dk_c$=95-143 barrers); Ionoflux Diffusion Coefficient (6.90× $10^{-3}$–8.44×$10^{-3}$ mm²/min); elastic modulus (1.0±0.1 MPa); and refractive index (1.42±0.12).

EXAMPLE 3

1 mM PAA (pH=2) Solution

To prepare 1 mM Poly(Acrylic Acid) (PAA) aqueous solution, 0.072 g PAA (Carbopol 907, powder) is gradually transferred into the 1000 ml bottle containing distilled water under stirring. Ensure the solution is stirring during the PAA addition. Stir the solution on the stirrer plate at room temperature overnight (~24 hrs). Verify that the PAA has fully dissolved. If the PAA has NOT fully dissolved, continue stirring and wait until no particulates are observed. 37% Hydrochloric add solution (HCl, Fluka-318949) is applied to adjust pH of the 1 mM PAA solution to 2 under the pH meter.
PBS (Phosphate-Buffered Saline).

To prepare PBS saline, 8 g of NaCl; 0.2 g of KCl; 1.44 g of $Na_2HPO_4$; 0.24 g of $KH_2PO_4$ are dissolved in 800 ml distilled $H_2O$. After adjusting pH to 7.4 with HCl, additional distilled $H_2O$ is then added to meet 1 L volume.
IPC-1 Saline.

Poly(AAm-co-AA)(90/10) partial sodium salt (~90% solid content, poly(AAm-co-AA) 90/10, Mw 200,000) is purchased from Polysciences, Inc. and used as received. PAE (Kymene, an azetidinium content of 0.46 assayed with NMR) is purchased from Ashland as an aqueous solution and used as received. An in-package-crosslinking (IPC) saline is prepared by dissolving about 0.07% w/w of poly (AAm-co-AA)(90/10) and about 0.15% of PAE (an initial azetidinium millimolar equivalents of about 8.8 millimole) in PBS (about 0.044 w/w % $NaH_2PO_4 \cdot H_2O$, about 0.388 w/w/% $Na_2HPO_4 \cdot 2H_2O$, about 0.79 w/w % NaCl) and adjusting the pH to 7.2~7.4. Then the IPC saline is heat pre-treated for about 6 hours at about 60° C. (heat pretreatment). During this heat pretreatment, poly(AAm-co-AA) and PAE are partially crosslinked to each other (i.e., not consuming all azetidinium groups of PAE) to form a water-soluble and thermally-crosslinkable hydrophilic polymeric material containing azetidinium groups within the branched polymer network in the IPC saline. After the heat pre-treatment, the IPC saline is filtered using a 0.22 micron PES membrane filter and cooled down back to room temperature. 5 ppm hydrogen peroxide is then added to the final IPC saline to prevent bioburden growth and the IPC saline is filtered using a 0.22 micron PES membrane filter.
Dry Lenses.

Silicone hydrogel contact lenses prepared in Example 2 are individually transferred to the dry tray and vacuum dried at 105° C. for minimum 2 hours before plasma coating.
Plasma Coating.

After loading the lenses in the plasma chamber of a rotary plasma treatment system, the chamber is then pumped down via rotary vacuum pump system to an absolute vacuum pressure 100 to 0 pa for 90 min. The plasma gas (air only, $O_2$ or $CO_2$) is then introduced into the chamber by means of mass flow control valves, pressure is monitored by the vacuum diapharm gauge, measured pressure is converted to electrical voltage. The plasma time is 11 min. Power across the electrodes is between 20 to 50 watts (power is preferably at 30 watts); Current is between 100 mA±10 mA (current set at 100 mA); Frequency set at 15 kHz for a good coating cycle="Si wafer thickness ~240 Å±60 Å"; Voltage is based on the current setting and the material inside chamber.
Plasma Quenching.

After the plasma coating, the plasma coated lenses are quickly (<60 s) transferred into 1 mM PAA aqueous solution with 1 min.
Packing/Autoclaving.

After rinsing in PBS twice for 30 min, the lenses are then packed in a Corona treated shell with IPC-1 saline for autoclave at 120° C. for 45 min.
Lens Characterization.

The wettability (measured by water contact angle), surface hydrophilicity (measured by WBUT) and lubricity (measured by friction rating) of silicone contact lenses after being subjected to one of surface treatments above are determined according to the procedures described in Example 1 and reported in Table 1.

TABLE 1

| Plasma gas | WBUT (s) | FR | WCA (°) |
|---|---|---|---|
| Control (w/o plasma treatment) | 0 | 4 | 117 |
| Air-only Plasma | 5 | 0-1 | <60 |
| $O_2$ plasma | 5 | 0-1 | <60 |
| $CO_2$ plasma | >5 | 0-1 | <60 |

Results in Table 1 show that the surface treatment (plasma-treatment+quenching in an aqueous PAA solution+ packaging/autoclaving in IPC-1 saline) can improve the wettability and lubricity of the silicone hydrogel contact lens (prepared in Example 2).

EXAMPLE 4

IPC-1 saline and PBS saline prepared in Example 3 are used in this Example.
IPC-2 Saline A reaction mixture is prepared by dissolving 3.0% by weight of mPEG-SH 2000 (Methoxy-Poly(Ethylene Glycol)-Thiol, Avg MW 2000, Product #M PEG-SH-2000, Laysan Bio Inc.) along with 17.72% by weight of PAE (Kymene from Ashland as an aqueous solution and used as received, azetidinium content of 0.46 assayed with NMR, solid content of 25.4%) in PBS and 7.5% of sodium citrate dihydrate. The pH of this solution is then adjusted to 7.5 and also degassed by bubbling nitrogen gas through the container for 2 hours. This solution is later heat treated for about 4 hours at 45° C. forming a thermally crosslinkable hydrophilic polymeric material containing mPEG-SH-2000 groups chemically grafted onto the polymer by reaction with the Azetidinium groups in PAE. After the heat-treatment, the solution is diluted 30-fold using PBS containing 0.25% sodium citrate, pH adjusted to 7.2~7.4, and then filtered using 0.22 micron polyether sulphone (PES) membrane filter. The final IPC saline contains about 0.25% by weight of the polymeric material (consisting of about 40% wt. mPEG-SH-2000 and about 60% wt. PAE) and 0.25% Sodium citrate dihydrate.
Plasma Coating (Air Plasma-Pretreated+Methane/Air Plasma-Treated)

There are three steps to complete the plasma treatment. The first step is the leak test, the second step is air only plasma pre-treatment, and the third step is $CH_4$/Air plasma treatment.

After silicone hydrogel contact lenses prepared in Example 2 (in dry state) are loaded in a plasma chamber, the chamber is then pumped down via rotary vacuum pump system to an absolute vacuum pressure 100 to 0 pa for 90 min. The plasma gas, air, is then introduced into the chamber by means of 0.0 sccm and 3.0 sccm for $CH_4$ and Air respectively. The plasma coating time is 3 min. Power across the electrodes is between 20 to 50 watts (power is at optimum at 30 watts); Current is 100 mA±10 mA (current set at 100 mA); Frequency set at 15 kHz; Voltage is based on the current setting, around 365 to 370 volt for Air only plasma treatment.

After the air only plasma pretreatment, plasma gases (a mixture of $CH_4$ and Air) are then introduced into the chamber by means of 2.0 sccm (flow unit: standard cubic centimeters per minute) and 1.0 sccm for $CH_4$ and Air respectively. The plasma coating time is 11 min. Power across the electrodes is between 20 to 50 watts (power is at optimum at 30 watts); Current is 100 mA±10 mA (current set at 100 mA); Frequency set at 15 kHz; Voltage is based on the current setting, around 345 to 350 volt for $CH_4$/Air Plasma treatment.

Plasma Quenching

The plasma coated lenses are quickly (<60 s) transferred into a quenching solution (IPC-1 or IPC-2) and immersed therein for about 1 min.

Packing/Autoclaving

After plasma quenching, lenses are rinsed in PBS twice for 30 min, packed in a Corona-treated shell with a IPC saline (IPC-1 or IPC-2), and autoclaved at 120° C. for 45 min.

Lens Characterization

The wettability (measured by water contact angle), surface hydrophilicity (measured by WBUT) and lubricity (measured by friction rating) of silicone hydrogel contact lenses after being subjected to one of surface treatments above are determined according to the procedures described in Example 1 and reported in Table 2.

Results in Table 2 show that the step of quenching plasma-treated lenses with a quenching solution free of any carboxyl-containing polymer (e.g., IPC-2) can improve the wettability but cannot improve lubricity of the silicone hydrogel contact lens from Example 2.

TABLE 2

| Plasma gas | Quenching Sol. | WBUT (s) | FR | WCA (°) |
|---|---|---|---|---|
| Control (no plasma treatment) | — | 0 | 4 | 117 |
| Air-pretreatment + $CH_4$/Air Plasma treatment | IPC-1 | 13 | 3.5 | 43 |
| | IPC-2 | 0 | 3.5 | 37 |

EXAMPLE 5

Silicone hydrogel contact lenses prepared in Example 2 are used in this example. 1 mM PAA (pH=2) aqueous, PBS saline and IPC-1 Saline prepared in Example 3 are used in this Example.

0.025% PAA/1-Propanol (1-PrOH)

To prepare 0.025% Poly(Acrylic Acid) (PAA) in 1-propanol (1-PrOH), 0.25 g PAA (Carbopol 907, powder) is gradually transferred into the 1000 ml bottle containing 1-PrOH under stirring. Ensure the solution is stirring during the PAA addition. Stir the solution on the stirrer plate at room temperature overnight (~24 hrs). Verify that the PAA has fully dissolved. If the PAA has NOT fully dissolved, continue stirring and wait until no particulates are observed. 37% Hydrochloric add solution (HCl, Fluka-318949) is applied to adjust pH of the 0.025% PAA/1-PrOH to 2 using a pH-Fix 1.7-3.8 indicator strip. The strip should first be fully wetted with DI water and then immersed in the PAA/1-PrOH solution until no further change in color of the strip is observed.

The tested lenses are classified into one of the groups according to the surface treatment to which silicone hydrogel contact lenses are subjected. The plasma treatments are carried out according to the procedures described in Examples 3 and 4.

Group 5-1:

Control lenses are silicone hydrogel contact lenses (prepared in Example 2) which are not plasma treated, then packed in PBS in Corona treated shells, and finally autoclaved at 120° C. for 45 min.

Group 5-2:

Silicon hydrogel contact lenses (Example 2) without plasma coating are immersed in 1 mM PAA (pH=2) aqueous for 1 min, rinsed in PBS twice for 30 min, packed in a Corona treated shell with PBS saline, and autoclaved at 120° C. for 45 min.

Group 5-3:

Silicon hydrogel contact lenses (Example 2) without plasma coating are immersed in 1 mM PAA (pH=2) aqueous for 2 min, rinsed in PBS twice for 30 min, packed in a Corona treated shell with PBS saline, and autoclaved at 120° C. for 45 min.

Group 5-4:

Silicon hydrogel contact lenses (Example 2) without plasma coating are immersed in 1 mM PAA (pH=2) aqueous for 5 min, rinsed in PBS twice for 30 min, packed in a Corona treated shell with PBS saline, and autoclaved at 120° C. for 45 min.

Group 5-5:

Silicon hydrogel contact lenses (Example 2) are treated with Air plasma for 11 min, immersed in 1 mM PAA (pH=2) aqueous for 1 min, rinsed in PBS twice for 30 min, packed in a Corona treated shell with PBS saline, and autoclaved at 120° C. for 45 min.

Group 5-6:

Silicon hydrogel contact lenses (Example 2) are treated with Air plasma for 11 min, immersed in 1 mM PAA (pH=2) aqueous for 2 min, rinsed in PBS twice for 30 min, packed in a Corona treated shell with PBS saline, and autoclaved at 120° C. for 45 min.

Group 5-7:

Silicon hydrogel contact lenses (Example 2) are treated with Air plasma for 11 min, immersed in 1 mM PAA (pH=2) aqueous for 5 min, rinsed in PBS twice for 30 min, packed in a Corona treated shell with PBS saline, and autoclaved at 120° C. for 45 min.

Group 5-8:

Silicon hydrogel contact lenses (Example 2) are treated air-only plasma for 11 min, immersed in 1 mM PAA (pH=2) aqueous for 1 min, rinsed in PBS twice for 30 min, packed in a Corona treated shell with IPC-1 saline, and autoclaved at 120° C. for 45 min.

Group 5-9:

Silicon hydrogel contact lenses (Example 2) are treated air-only plasma for 11 min, immersed in 1 mM PAA (pH=2) aqueous for 2 min, rinsed in PBS twice for 30 min, packed in a Corona treated shell with IPC-1 saline, and autoclaved at 120° C. for 45 min.

Group 5-10: Silicon hydrogel contact lenses (Example 2) are treated air-only plasma for 11 min, immersed in 1 mM PAA (pH=2) aqueous for 5 min, rinsed in PBS twice for 30 min, packed in a Corona treated shell with IPC-1 saline, and autoclaved at 120° C. for 45 min.

TABLE 3

| Len Group | Plasma | Immersed in PAA Sol. (1 mM, pH = 2) | Packaging saline | WBUT | FR | WCA |
|---|---|---|---|---|---|---|
| 5-1 | — | NO | PBS | 0 s | 4 | 117° |
| 5-2 | Without | 1 min | PBS | 10 s | 2 | 103° |
| 5-3 | plasma | 2 min | PBS | 15 s | 2 | 91° |
| 5-4 |  | 5 min | PBS | 9 s | 2 | 104° |
| 5-5 | Air-only | 1 min | PBS | 9 s | 2 | 29° |
| 5-6 | plasma | 2 min | PBS | 11 s | 3 | 29° |
| 5-7 |  | 5 min | PBS | 14 s | 2 | 25° |
| 5-8 | Air-only | 1 min | IPC-1 | 15 s | 1 | 28° |
| 5-9 | plasma | 2 min | IPC-1 | 16 s | 1 | 27° |
| 5-10 |  | 5 min | IPC-1 | 16 s | 1 | 25° |

Results in Table 3 show that a surface treatment of the invention can be used to improve the surface hydrophilicity, lubricity, and surface wettability of silicone hydrogel contact lenses.

XPS Test

Table 4 shows the XPS data of the concentration of N and Si on the surfaces of 5 types of silicone hydrogel contact lenses.

(1) Control lens: silicone hydrogel contact lenses from Example 2 without any surface treatment.

(2) (PAA dipping)-treated lenses: silicone contact lenses prepared in Example 2 are not subjected to any plasma treatment, but coated by dipping them in 0.025% PAA/1-PrOH for 1 min.

(3) (Plasma+water)-treated lenses: silicone contact lenses prepared in Example 2 are subjected to air plasma treatment and followed by dipping them in water for about two hours.

(4) (Plasma+IPC-1 quenching+IPC-1 packinq/autoclaving)-treated lenses: silicone contact lenses prepared in Example 2 are subjected to air plasma treatment and followed by dipping them in IPC-1 saline for about two hours, and finally packaged/autoclaved in the IPC-1 saline.

(5) (Plasma+PAA quenching+IPC-1 packing/autoclaving)-treated lenses: silicone contact lenses prepared in Example 2 are subjected to air plasma treatment, followed by dipping them in an PAA aqueous solution (1 mM PAA, pH=2.0) for about 1 min, 2 min and 5 min respectively. After rinsing in PBS twice for 30 min, the lenses are then packed in a Corona treated shell with IPC-1 saline for autoclave at 120° C. for 45 min.

It is found that the silicon content on the lens surface of the (plasma+PAA+IPC-1)-treated silicone hydrogel contact lenses are substantially reduced, relative to that of the control silicone contact lenses.

TABLE 4

| Lens Type | Plasma | Immersed in | XPS N (%) | XPS Si (%) |
|---|---|---|---|---|
| (1) | w/o Plasma | NA | 4.9 | 12.6 |
| (2) | w/o Plasma | 0.025% PAA/1-PrOH | — | — |
| (3) | Air plasma | water | 7.3 | 7.5 |
| (4) | Air plasma | IPC-1 | 9.3 | 5.5 |
| (5) | Air plasma | PAA (pH = 2) for 1 min | 11.1 | 1.7 |
| (5) | Air plasma | PAA (pH = 2) for 2 min | 10.6 | 1.6 |
| (5) | Air plasma | PAA (pH = 2) for 5 min | 8.8 | 5.0 |

Methylene Blue Staining Test (M.B.S.T)

Methylene blue is positively charged and will bind to negatively charged surface as shown by staining. Such staining text can be used to determining whether a PAA layer is deposed or attached onto silicone contact lenses with or without subjecting to any plasma treatment and whether a water-soluble thermally crosslinkable hydrophilic polymeric material is crosslinked onto the PAA layer on the surface of a silicone contact lens.

Methylene blue is purchased from Sigma-Aldrich, and is used as received. 200 ppm Methylene blue aqueous is prepared by adding 0.2 g Methylene blue into 999.8 g distilled water with stirring at room temperature overnight. It is always freshly prepared.

For the Methylene Blue Staining Test, each lens is soaked in 20 ml of 200 ppm methylene blue aqueous for 30 min. After rinsing in 500 ml water twice for 30 min, the lens is kept in water for staining assessment. The summary of the Methylene Blue Staining Test is shown in Table 5.

TABLE 5

| | Immersed in a liquid after plasma treatment | M.B.S.T |
|---|---|---|
| Without Plasma | — | Not stained |
| Without Plasma | 0.025% PAA/1-PrOH for 1 min | Lightly stained |
| Without Plasma | 0.025% PAA/1-PrOH for 2 min | stained |
| Without Plasma | 0.025% PAA/1-PrOH for 5 min | Heavily stained |
| Air-only plasma | water | Not stained |
| Air-only plasma | 1 mM PAA (pH = 2) aqueous for 1 min | Heavily stained |
| Air-only plasma | 1 mM PAA (pH = 2) aqueous for 2 min | Heavily stained |
| Air-only plasma | 1 mM PAA (pH = 2) aqueous for 5 min | Heavily stained |

The results in Table 5 indicate that plasma-treated lenses and non-plasma-treated lenses can be coated with a layer of PAA by immersing them in a PAA solution, as indicated by the methylene blue staining.

EXAMPLE 6

Silicone hydrogel contact lenses prepared in Example 2, aqueous PAA solution (1 mM, pH 2) prepared in Example 3, IPC-1 saline prepared in Example 3, and PBS saline prepared in Example 3 are used in this Example.

1 mM PAA solution (pH 4)

1 mM Poly(Acrylic Acid) (PAA) aqueous solution (pH 4) is prepared according to the procedure described above, except that the pH is adjusted to 4.

1 mM PAA solution (pH 8)

1 mM Poly(Acrylic Acid) (PAA) aqueous solution (pH 8) is prepared according to the procedure described above, except that the pH is adjusted to 8 with a 50% Sodium hydroxide solution (NaOH, Sigma-Aldrich-415413).

10 mM PAA solution (pH 4)

10 mM Poly(Acrylic Acid) (PAA) aqueous solution (pH 4) is prepared according to the procedure described above, except that the pH is adjusted to 4.

Surface Treatment

Silicone hydrogel contact lenses prepared in Example 2 are subjected to the air-only plasma treatments. The Air plasma-treatment is carried out as described for Example 3. After the Air plasma treatment, the plasma coated lenses are quickly (<60 s) transferred into PAA aqueous with 1 min. After rinsing in PBS twice for 30 min, the lenses are then packed in a Corona treated shell with IPC-1 saline for autoclave at 120° C. for 45 min.

Lens Characterization

The wettability (measured by water contact angle), hydrophilicity (measured by WBUT) and lubricity (measured by friction rating) of silicone contact lenses after being subjected to one of surface treatments above are determined according to the procedures described in Example 1 and reported in Table 6. The XPS data is in Table 7.

TABLE 6

| Surface Treatment | Quenching solution | WBUT (s) | FR | WCA (°) |
|---|---|---|---|---|
| No plasma (Control) | No | 0 | 4 | 108 |
| air-only plasma | Water | 2 | 4 | 74 |
| air-only plasma | 1 mM PAA (pH = 2) | 15 | 0 | 41 |
| air-only plasma | 1 mM PAA (pH = 4) | 14 | 3.5 | 43 |
| air-only plasma | 1 mM PAA (pH = 8) | 2 | 4 | 76 |
| air-only plasma | 10 mM PAA (pH = 4) | 14 | 0.5 | 24 |

TABLE 7

| Surface Treatment | Quenching solution | C (%) | N (%) | O (%) | F (%) | Si (%) |
|---|---|---|---|---|---|---|
| No plasma (Control) | No | 50.0 | 3.5 | 25.9 | 5.9 | 14.6 |
| air-only plasma | Water | 53.1 | 7.3 | 25.7 | 6.4 | 7.5 |
| air-only plasma | 1 mM PAA (pH = 2) | 54.7 | 10.1 | 27.1 | 5.1 | 3.0 |
| air-only plasma | 1 mM PAA (pH = 4) | 53.3 | 7.8 | 26.1 | 6.8 | 6.0 |
| air-only plasma | 1 mM PAA (pH = 8) | 53.1 | 7.3 | 25.9 | 6.1 | 7.6 |
| air-only plasma | 10 mM PAA (pH = 4) | 53.0 | 10.3 | 27.3 | 6.1 | 3.3 |

The results in Tables 6 and 7 indicate that lower silicon content on the lens surface, higher hydrophilicity (WBUT), and higher lubricity can be achieved, if the PAA solution has a lower pH (e.g., about 2) and/or a higher concentration of PAA (e.g., about 10 mM).

EXAMPLE 7

In this example, 1 mM PAA (pH=2) aqueous, PBS saline and IPC-1 Saline are prepared as the same as in Example 3; and IPC-2 are prepared as the same as in Example 4; 0.025% Poly(Acrylic Acid) (PAA) in 1-propanol (1-PrOH) is prepared as the same as in Example 5. Silicone hydrogel contact lenses prepared in Example 2 are used in this Example.

The tested lenses are classified into one of the groups according to the surface treatment to which silicone hydrogel contact lenses are subjected. The plasma treatments are carried out according to the procedures described in Examples 3 and 4.

Group 7-1:

The $1^{st}$ type of control lenses are SiHy contact lenses (Example 2) which are not plasma-treated, but dipped in 0.025% PAA/1-PrOH for 1 min, rinsed in PBS twice for 30 min, packed in a Corona treated shell with IPC-2 saline, and autoclaved at 120° C. for 45 min.

Group 7-2:

The $2^{nd}$ type of control lenses are SiHy contact lenses (Example 2) which are not plasma-treated, but dipped in 0.025% PAA/1-PrOH for 1 min, rinsed in PBS twice for 30 min, packed in a Corona treated shell with IPC-1 saline, and autoclaved at 120° C. for 45 min.

Group 7-3:

The $3^{rd}$ type of control lenses are SiHy contact lenses (Example 2) which are not plasma-treated, but dipped in 1 mM PAA (pH=2) aqueous for 1 min, rinsed in PBS twice for 30 min, packed in a Corona treated shell with IPC-1 saline, and autoclaved at 120° C. for 45 min.

Group 7-4:

Silicon hydrogel (SiHy) contact lenses (Example 2) are treated with air-only plasma, followed by dipping in 1 mM PAA (pH=2) aqueous for 1 min and rinsing in PBS twice for 30 min, then are packed in a Corona treated shell with IPC-1 saline and autoclaved at 120° C. for 45 min.

Group 7-5:

SiHy contact lenses (Example 2) are treated with air-only plasma and followed by dipping in 1 mM PAA (pH=2) aqueous for 2 min and rinsing in PBS twice for 30 min, are then packed in a Corona treated shell with IPC-1 saline and autoclaved at 120° C. for 45 min.

Group 7-6:

SiHy contact lenses (Example 2) are treated with air-only plasma and followed by dipping in 1 mM PAA (pH=2) aqueous for 5 min and rinsing in PBS twice for 30 min, are then packed in a Corona treated shell with IPC-1 saline and autoclaved at 120° C. for 45 min.

Group 7-7:

SiHy contact lenses (Example 2) are pretreated with Air plasma, followed by treating with $CH_4$/air plasma, quenching in IPC-1 for 2 hours, and rinsing in PBS twice for 30 min, and then are packed in a Corona treated shell with IPC-1 saline and autoclaved at 120° C. for 45 min.

The results of PHMB uptake are reported in Table 8.

TABLE 8

| Plasma | Dip or quenching | Packaging saline | PHMB uptake (µg/lens) |
|---|---|---|---|
| 7-1 No | Dip in 0.025% PAA/1-PrOH, pH = 2, 1 min | IPC-2 | 25.28 |
| 7-2 NO | Dip in 0.025% PAA/1-PrOH, pH = 2, 1 min | IPC-1 | 22.35 |
| 7-3 NO | Dip in 1 mM PAA, pH = 2, aq, 1 min | IPC-1 | 4.98 |
| 7-4 Air-only | Quenching in 1 mM PAA, pH = 2, aq, 1 min | IPC-1 | 0.89 |

TABLE 8-continued

| Plasma | Dip or quenching | Packaging saline | PHMB uptake (µg/lens) |
|---|---|---|---|
| 7-5 Air-only | Quenching in 1 mM PAA, pH = 2, aq, 2 min | IPC-1 | 1.34 |
| 7-6 Air-only | Quenching in 1 mM PAA, pH = 2, aq, 5 min | IPC-1 | 1.42 |
| 7-7 Air-pretreat + $CH_4$/air-treat | Quenching in IPC-1, 2 h | IPC-1 | 0.25 |

It is found that:

(1) PHMB uptake is above 20 ug/lens of the silicon hydrogel lens with dip-coating in 0.025% PAA/1-PrOH for 1 min, which indicates the PAA layer coated is pretty thick. The packaging saline of IPC-2 and IPC-1 do not change PHMB uptake behavior.

(2) PHMB uptake is about 5 ug/lens of the silicon hydrogel lens with dip-coating in 1 mM PAA (pH=2) aqueous for 1 min. Compared with PHMB uptake results of lenses coated by dip-coating in PAA aqueous and PAA/1-PrOH, the dip-coating solvent plays key role on forming PAA anchor layer.

(3) Plasma quenching in PAA or carboxyl-free polymer (IPC-1) almost has NO PHMB uptake, which demonstrate that plasma quenching in PAA aqueous just creates a pretty thin PAA anchor layer.

EXAMPLE 8

IPC-1 saline, PBS saline, and 1 mM PAA (pH=2) aqueous solution prepared in Example 3 are used in this Example.

Silicone hydrogel contact lenses prepared in Example 2 are individually transferred to a dry tray and vacuum dried at 105° C. for minimum 2 hours before plasma coating. The $CO_2$ or the mixture of $CO_2/CH_4$ plasma treatment of the silicon hydrogel contact lenses is carried out as described for Example 3. After the $CO_2$ or the mixture of $CO_2/CH_4$ plasma treatment, the plasma coated lenses are quickly (<60 s) transferred into 1 mM PAA (pH=2) for 1 min, in water 20 min and in IPC-1 with 20 min respectively. After rinsing in PBS twice for 30 min, the lenses are then packed in a Corona treated shell with IPC-1 saline and autoclaved at 120° C. for 45 min.

The surface hydrophilicity (measured by WBUT) and lubricity (measured by friction rating) of silicone hydrogel contact lenses after being subjected to the above plasma quenching are determined according to the procedures described in Example 1 and reported in Table 9. Wettable, hydrophilic, and lubricious lens surface have been achieved by $CO_2$ or the mixture of $CO_2/CH_4$ plasma treatment with quenching in 1 mM PAA (pH=2) aqueous for even 1 min.

TABLE 9

| | Quenching in 1 mM PAA, pH = 2, 1 min | | Quenching in water | | Quenching in IPC-1 WBUT | |
|---|---|---|---|---|---|---|
| Plasma gas | WBUT (s) | FR | WBUT (s) | FR | (s) | FR |
| $CO_2$-only | 11, 13, 18 | 0, 1, 2 | 2, 2 | 3, 5 | 6, 7 | 2, 3 |
| $CO_2/CH_4 = 1:1$ | 13, 13 | 1, 1 | 3, 5 | 3.5, 3.5 | 8, 8 | 2, 2 |
| $CO_2/CH_4 = 2:1$ | 14, 14 | 0, 0 | 12, 13 | 4, 4 | 12, 14 | 3, 3 |
| $CO_2/CH_4 = 4:1$ | 15, 15 | 1, 1 | 10, 12 | 4, 4 | 11, 14 | 3.5, 3.5 |

EXAMPLE 9

IPC-1 saline, PBS saline, and 1 mM PAA (pH=2) aqueous solution prepared in Example 3 are used in this Example.

A DOE (design of experiments) has been carried out to screen the best conditions to achieve the wettable and lubricious surface on silicon hydrogel contact lens. This surface treatment contains three steps. The first step is the plasma with different plasma gas; the second step is the quenching process in aqueous containing hydrophilic polymers; the third step is the packaging saline for autoclaving. Thus there are two factors in the DOE screening: plasma gas and quenching solution.

The screening of plasma gas: (1) $O_2$ only; (2) $CO_2$ only; (3) $CH_4$ only; (4) $CO_2/CH_4=4:1$; (5) $CO_2/CH_4=2:1$; (6) $CO_2/CH_4=1:1$; (7) $O_2/CH_4=4:1$; (8) $O_2/CH_4=2:1$; (9) $O_2/CH_4=1:1$. The screening of quenching aqueous solutions: (1) water; (2) 1 mM PAA; (3) IPC-1 saline. For the DOE samples, the packaging saline will be the IPC-1 saline. The lens evaluations are WBUT and friction rating, as reported in Table 10.

TABLE 10

| Plasma gas | Quenching sol. | Packing Saline | WBUT | FR | WCA (°) |
|---|---|---|---|---|---|
| $O_2$ | $H_2O$ | IPC-1 | 1 | 4 | — |
| $CO_2$ | $H_2O$ | IPC-1 | 2 | 3.5 | — |
| $CH_4$ | $H_2O$ | IPC-1 | 0, 0 | 4, 4 | — |
| $O_2/CH_4 = 1:1$ | $H_2O$ | IPC-1 | 12, 13 | 4, 4 | — |
| $O_2/CH_4 = 2:1$ | $H_2O$ | IPC-1 | 11, 12 | 4, 4 | — |
| $O_2/CH_4 = 4:1$ | $H_2O$ | IPC-1 | 1, 2 | 4, 4 | — |
| $CO_2/CH_4 = 1:1$ | $H_2O$ | IPC-1 | 3, 5 | 3.5, 3.5 | — |
| $CO_2/CH_4 = 2:1$ | $H_2O$ | IPC-1 | 12, 13 | 4, 4 | — |
| $CO_2/CH_4 = 4:1$ | $H_2O$ | IPC-1 | 10, 12 | 4, 4 | — |
| $O_2$ | 1 mM PAA | IPC-1 | 10 | 1 | — |
| $CO_2$ | 1 mM PAA | IPC-1 | 18, 11, 13 | 0, 1,2 | 34 |
| $CH_4$ | 1 mM PAA | IPC-1 | 12, 16 | 1, 1 | — |
| $O_2/CH_4 = 1:1$ | 1 mM PAA | IPC-1 | 16, 16 | 3, 3 | — |
| $O_2/CH_4 = 2:1$ | 1 mM PAA | IPC-1 | 15, 17 | 0.5, 0.5 | — |
| $O_2/CH_4 = 4:1$ | 1 mM PAA | IPC-1 | 16, 18 | 0, 0 | — |
| $CO_2/CH_4 = 1:1$ | 1 mM PAA | IPC-1 | 13, 13 | 1, 1 | 18 |
| $CO_2/CH_4 = 2:1$ | 1 mM PAA | IPC-1 | 14, 14 | 0, 0 | 24 |
| $CO_2/CH_4 = 4:1$ | 1 mM PAA | IPC-1 | 15, 15 | 1, 1 | 87 |
| $O_2$ | IPC-1 | IPC-1 | 10 | 1 | — |
| $CO_2$ | IPC-1 | IPC-1 | 7, 6, 7 | 2, 2, 3 | 21 |
| $CH_4$ | IPC-1 | IPC-1 | 0, 8 | 4, 4 | — |
| $O_2/CH_4 = 1:1$ | IPC-1 | IPC-1 | 10, 13 | 4, 4 | — |
| $O_2/CH_4 = 2:1$ | IPC-1 | IPC-1 | 8, 10 | 3, 3 | — |
| $O_2/CH_4 = 4:1$ | IPC-1 | IPC-1 | 10, 11 | 3, 3 | — |
| $CO_2/CH_4 = 1:1$ | IPC-1 | IPC-1 | 8, 8 | 2, 2 | 32 |
| $CO_2/CH_4 = 2:1$ | IPC-1 | IPC-1 | 12, 14 | 3, 3 | 63 |
| $CO_2/CH_4 = 4:1$ | IPC-1 | IPC-1 | 11, 14 | 3.5, 3.5 | 24 |

EXAMPLE 10

The plasma coating thickness is obtained by measuring the thickness increase on silicon wafers after they have been coated in the same plasma chamber. The thickness of the plasma coatings on silicone hydrogel contact lenses after being subjected to plasma treatment using different plasma gases for 11 minutes is determined, according to the procedures described in Example 1, to be the following: 24-30 A° ($O_2$ plasma); 25-31 A° (air plasma); 24-26 A° ($CO_2$ plasma); 233 A° ($CH_4$ plasma); 249 A° ($CH_4$/Air=2:1 plasma); 270 A° ($CO_2$/$CH_4$=1:1 plasma); 72 A° ($CO_2$/$CH_4$=2:1 plasma); 28 A° ($CO_2$/$CH_4$=4:1); 120 A° ($O_2$/$CH_4$=1:1 plasma); 146 A° ($O_2$/$CH_4$=2:1 plasma); and 104 A° ($O_2$/$CH_4$=4:1 plasma) respectively.

EXAMPLE 11

In this example, 1 mM PAA (pH=2) aqueous, PBS saline and IPC-1 Saline are prepared as the same as in Example 3. Silicone hydrogel contact lenses prepared in Example 2 are used in this Example.

Plasma Treatment

Air plasma treatment of silicone hydrogel contact lenses is carried out according to the procedures described in Example 3; $CH_4$/Air (2:1) plasma treatment of silicone hydrogel contact lenses is carried out according to the procedures described in Example 4. The thickness of the air plasma coating and the $CH_4$/Air plasma coating on a lens is estimated to be 28 A° and 213 A° respectively.

0.5% PEI solution (pH 9.2)

Polyethyleneimine (PEI), branched (30% solution in water, Mw=70,000) is from Polysciences Inc. and is used as received. An aqueous solution of PEI (0.5% by weight, pH 9.2) is prepared by adding 6.8 g PEI into 393.2 g distilled water. Stir the solution on the stirrer plate at room temperature about 3 hours.

0.5% PEI solution (pH 11.0)

An aqueous solution of PEI (0.5% by weight, pH 11.0) is prepared by adjusting pH of 0.5% PEI solution (pH 9.2) using a 50% Sodium hydroxide solution (NaOH, Sigma-Aldrich-415413).

0.5% PAH solution (pH3.4)

Polyallylamine hydrochloride (PAH, Mw=17,500) is from Aldrich. An aqueous solution of PAH (0.5% by weight, pH 3.4) is prepared by adding 1 g PAH into 199 g distilled water. Stir the solution on the stirrer plate at room temperature about 3 hours.

0.5% PAH solution (pH 10.4)

An aqueous solution of PAH (0.5% by weight, pH 10.4) is prepared by adjusting pH of 0.5% PAH solution (pH 10.4) using a 50% Sodium hydroxide solution (NaOH, Sigma-Aldrich-415413).

Surface Treatment

The tested lenses are classified into one of the groups according to the surface treatment to which silicone hydrogel contact lenses are subjected. The plasma treatments are carried out according to the procedures described in Examples 3 and 4.

Group 11-1a:
Silicon hydrogel contact lenses (Example 2) are treated with air-only plasma, followed by dipping in water for 20 min and subsequently in 1 mM PAA (pH=2) aqueous for 20 min and rinsing in PBS twice for 30 min, then are packed in a Corona treated shell with IPC-1 saline and autoclaved at 120° C. for 45 min.

Group 11-1b:
Silicon hydrogel contact lenses (Example 2) are treated with air-only plasma, followed by dipping in 0.5% PEI (pH 9.2) aqueous solution for 20 min and rinsing in PBS twice for 30 min, then are packed in a Corona treated shell with IPC-1 saline and autoclaved at 120° C. for 45 min.

Group 11-1c:
Silicon hydrogel contact lenses (Example 2) are treated with air-only plasma, followed by dipping in 0.5% PEI (pH 3.4) aqueous solution for 20 min and rinsing in PBS twice for 30 min, then are packed in a Corona treated shell with IPC-1 saline and autoclaved at 120° C. for 45 min.

Group 11-1d:
Silicon hydrogel contact lenses (Example 2) are treated with air-only plasma, followed by dipping in 0.5% PAH (pH 11.0) aqueous solution for 20 min and rinsing in PBS twice for 30 min, then are packed in a Corona treated shell with IPC-1 saline and autoclaved at 120° C. for 45 min.

Group 11-1e:
Silicon hydrogel contact lenses (Example 2) are treated with air-only plasma, followed by dipping in 0.5% PAH (pH 10.4) aqueous solution for 20 min and rinsing in PBS twice for 30 min, then are packed in a Corona treated shell with IPC-1 saline and autoclaved at 120° C. for 45 min.

Group 11-2a:
Silicon hydrogel contact lenses (Example 2) are treated with $CH_4$/Air plasma, followed by dipping in water for 20 min and subsequently in 1 mM PAA (pH=2) aqueous for 20 min and rinsing in PBS twice for 30 min, then are packed in a Corona treated shell with IPC-1 saline and autoclaved at 120° C. for 45 min.

Group 11-2b:
Silicon hydrogel contact lenses (Example 2) are treated with $CH_4$/Air plasma, followed by dipping in 0.5% PEI (pH 9.2) aqueous solution for 20 min and rinsing in PBS twice for 30 min, then are packed in a Corona treated shell with IPC-1 saline and autoclaved at 120° C. for 45 min.

Group 11-2c:
Silicon hydrogel contact lenses (Example 2) are treated with $CH_4$/Air plasma, followed by dipping in 0.5% PEI (pH 3.4) aqueous solution for 20 min and rinsing in PBS twice for 30 min, then are packed in a Corona treated shell with IPC-1 saline and autoclaved at 120° C. for 45 min.

Group 11-2d:
Silicon hydrogel contact lenses (Example 2) are treated with $CH_4$/Air plasma, followed by dipping in 0.5% PAH (pH 11.0) aqueous solution for 20 min and rinsing in PBS twice for 30 min, then are packed in a Corona treated shell with IPC-1 saline and autoclaved at 120° C. for 45 min.

Group 11-2e:
Silicon hydrogel contact lenses (Example 2) are treated with $CH_4$/Air plasma, followed by dipping in 0.5% PAH (pH 10.4) aqueous solution for 20 min and rinsing in PBS twice for 30 min, then are packed in a Corona treated shell with IPC-1 saline and autoclaved at 120° C. for 45 min.

The wettability (measured by water contact angle), hydrophilicity (measured by WBUT) and lubricity (measured by friction rating) of silicone contact lenses after being subjected to one of surface treatments above are determined according to the procedures described in Example 1 and reported in Tables 11.

TABLE 11

| Lens Group # | Plasma gas | Quenching Sol. | WBUT (s) | FR | WCA (°) | FR (j)* |
|---|---|---|---|---|---|---|
| 11-1a | Air | PAA (pH 2) | 22, 19 | 0-1 | 33 | 0-1 |
| 11-1b | Air | PEI (pH 9.2) | 2, 1 | 4 | 84 | 4 |
| 11-1c | Air | PAH (pH 3.4) | 4, 3 | 4 | 59 | 4 |
| 11-1d | Air | PEI (pH 11.0) | 15, 15 | 3-4 | 37 | 4 |
| 11-1e | Air | PAH (pH 10.4) | 14, 12 | 3-4 | 29 | 4 |
| 11-2a | $CH_4$/Air | PAA (pH 2) | 18, 18 | 0-1 | 37 | 0-1 |
| 11-2b | $CH_4$/Air | PEI (pH 9.2) | 6, 9 | 4 | 38 | 4 |
| 11-2c | $CH_4$/Air | PAH (pH 3.4) | 14, 2 | 4 | 38 | 4 |

TABLE 11-continued

| Lens Group # | Plasma gas | Quenching Sol. | WBUT (s) | FR | WCA (°) | FR (j)* |
|---|---|---|---|---|---|---|
| 11-2d | CH$_4$/Air | PEI (pH 11.0) | 14, 16 | 3-4 | 31 | 4 |
| 11-2e | CH$_4$/Air | PAH (pH 10.4) | 18, 16 | 3-4 | 22 | 4 |

*friction rating determined after j = 7 cycles of digital rubbing tests and then being immersed in PBS over weekend.

What is claimed is:

1. A method for producing soft contact lenses, comprising the steps of:
   (1) obtaining a preformed silicone hydrogel contact lens in a dry state;
   (2) subjecting the preformed silicone hydrogel contact lens in the dry state to a surface treatment to obtain a silicone hydrogel contact lens with a base coating thereon, wherein the base coating comprises a prime plasma layer, a reactive polymer layer on top of the prime plasma layer, and reactive functional groups selected from the group consisting of carboxyl groups, primary amino groups, secondary amino groups, and combinations thereof, wherein the surface treatment comprises the sub-steps of
      (a) plasma-treating the surface of the preformed silicone hydrogel contact lens in the dry state with a plasma to obtain a silicone hydrogel contact lens with the prime plasma layer thereon, wherein the plasma is generated in a plasma gas composed of air, $N_2$, $O_2$, $CO_2$, or a mixture of a $C_1$-$C_6$ hydrocarbon and a secondary gas selected from the group consisting of air, $N_2$, $O_2$, $CO_2$, and combinations thereof, wherein the prime plasma layer has a thickness of from about 0.5 nm to about 40 nm, and
      (b) contacting the silicone hydrogel contact lens with the prime plasma layer thereon with a first aqueous solution including a reactive hydrophilic polymer having multiple reactive functional groups selected from the group consisting of carboxyl groups, primary amino groups, secondary amino groups, and combinations thereof to form the base coating which include the reactive polymer layer of the reactive hydrophilic polymer on top of the prime plasma layer; and
   (3) heating the silicone hydrogel contact lens with the base coating thereon obtained in step (2), in a second aqueous solution which comprises a water-soluble and thermally-crosslinkable hydrophilic polymeric material having azetidinium groups and optionally primary or secondary amino groups and/or carboxyl groups, at a temperature of from about 60° C. to about 140° C. for a time period sufficient long to crosslink the water-soluble thermally-crosslinkable hydrophilic polymeric material and the base coating so as to form a hydrogel coating on the silicone hydrogel contact lens, wherein the silicone hydrogel contact lens in fully hydrated state has a WBUT of at least about 10 seconds and a friction rating of about 3 or lower.

2. The method of claim 1, wherein the plasma is generated in a plasma gas compose of $CO_2$, or a mixture of methane and $CO_2$.

3. The method of claim 1, wherein the first aqueous solution has a pH from about 1.0 to about 3.0, and wherein the reactive hydrophilic polymer is a polyanionic polymer comprising carboxyl groups and having a weight average molecular weight of at least 1000 Daltons.

4. The method of claim 3, wherein the polyanionic polymer is selected from the group consisting of polyacrylic acid, polymethacrylic acid, polyethylacrylic acid, poly (acrylic acid-co-methacrylic acid), poly(acrylic acid-co-ethacrylic acid), poly(methacrylic acid-co-ethacrylic acid), and a mixture thereof.

5. The method of claim 1, wherein the first aqueous solution has a pH from about 9.5 to about 11.0, wherein the reactive hydrophilic polymer is a polycationic polymer comprising primary and/or secondary amino groups and having a weight average molecular weight of at least 1000 Daltons.

6. The method of claim 5, wherein the polycationic polymer is selected from the group consisting of polyethyleneimine, polyallylamine, polyvinylamine, polyamidoamine, and a mixture thereof.

7. The method of claim 1, wherein the reactive hydrophilic polymer comprises azetidinium groups and reactive functional groups selected from the group consisting of primary groups, secondary amino groups, carboxyl groups, and combinations thereof, wherein the reactive hydrophilic polymer has a weight average molecular weight of at least 1000 Daltons, wherein the first aqueous solution has a pH of less than about 8.0.

8. The method of claim 7, wherein the reactive hydrophilic polymer is a chemically-modified poly(2-oxazoline-co-ethyleneimine)-epichlorohydrin, a chemically-modified polyamidoamine-epichlorohydrin, or combinations thereof, wherein the chemically-modified poly(2-oxazoline-co-ethyleneimine)-epichlorohydrin or the chemically-modified polyamidoamine-epichlorohydrin comprises (i) from about 20% to about 95% by weight of first polymer chains derived from a polyamidoamine-epichlorohydrin or a poly(2-oxazoline-co-ethyleneimine)-epichlorohydrin, (ii) from about 5% to about 80% by weight of hydrophilic moieties or second polymer chains derived from at least one hydrophilicity-enhancing agent having at least two reactive functional groups selected from the group consisting of amino group, carboxyl group, and combination thereof, wherein the hydrophilic moieties or second polymer chains are covalently attached to the first polymer chains through one or more covalent linkages each formed between one azetitdinium group of the polyamidoamine-epichlorohydrin or the poly(2-oxazoline-co-ethyleneimine)-epichlorohydrin and one amino, carboxyl or thiol group of the hydrophilicity-enhancing agent, and (iii) azetidinium groups which are parts of the first polymer chains or pendant or terminal groups covalently attached to the first polymer chains.

9. The method of claim 1, wherein the water-soluble thermally crosslinkable hydrophilic polymeric material is a poly(2-oxazoline-co-ethyleneimine)-epichlorohydrin, a chemically-modified poly(2-oxazoline-co-ethyleneimine)-epichlorohydrin, a chemically-modified polyamidoamine-epichlorohydrin, or combinations thereof, wherein the chemically-modified poly(2-oxazoline-co-ethyleneimine)-epichlorohydrin or the chemically-modified polyamidoamine-epichlorohydrin comprises (i) from about 20% to about 95% by weight of first polymer chains derived from a polyamidoamine-epichlorohydrin or a poly(2-oxazoline-co-ethyleneimine)-epichlorohydrin, (ii) from about 5% to about 80% by weight of hydrophilic moieties or second polymer chains derived from at least one hydrophilicity-enhancing agent having at least one reactive functional group selected from the group consisting of amino group, carboxyl group, thiol group, and combination thereof, wherein the hydrophilic moieties or second polymer chains are covalently attached to the first polymer chains through one or more covalent linkages each formed between one azetitdinium group of the polyamidoamine-epichlorohydrin or the poly(2-oxazoline-co-ethyleneimine)-epichlorohydrin and one amino, carboxyl or thiol group of the hydrophilicity-enhancing agent, and (iii) azetidinium groups which are parts of the first polymer chains or pendant or terminal groups covalently attached to the first polymer chains.

10. The method of claim 9, wherein the water-soluble thermally crosslinkable hydrophilic polymeric material is a chemically-modified poly(2-oxazoline-co-ethyleneimine)-epichlorohydrin or a chemically-modified polyamidoamine-epichlorohydrin, wherein the chemically-modified poly(2-oxazoline-co-ethyleneimine)-epichlorohydrin and the chemically-modified polyamidoamine-epichlorohydrin independently of each other comprise:
  (i) from about 20% to about 95% by weight of first polymer chains derived from a polyamidoamine-epichlorohydrin or a poly(2-oxazoline-co-ethyleneimine)-epichlorohydrin;
  (ii) from about 5% to about 80% by weight of hydrophilic moieties or second polymer chains derived from at least one hydrophilicity-enhancing agent having at least one reactive functional group selected from the group consisting of amino group, carboxyl group, thiol group, and combination thereof; and
  (iii) positively-charged azetidinium groups which are parts of the first polymer chains or pendant or terminal groups covalently attached to the first polymer chains, wherein the hydrophilic moieties or second polymer chains are covalently attached to the first polymer chains through one or more covalent linkages each formed between one azetitdinium group of the polyamidoamine-epichlorohydrin or the poly(2-oxazoline-co-ethyleneimine)-epichlorohydrin and one amino, carboxyl or thiol group of the hydrophilicity-enhancing agent.

11. The method of claim 10, wherein the hydrophilicity-enhancing agent is a hydrophilic polymer having one or more amino, carboxyl and/or thiol groups, wherein the content of the amino, carboxyl and/or thiol groups in the hydrophilic polymer as the hydrophilicity-enhancing agent is less than about 40% by weight based on the total weight of the hydrophilic polymer.

12. The method of claim 10, wherein the hydrophilicity-enhancing agent is: PEG-NH$_2$; PEG-SH; PEG-COOH; H$_2$N-PEG-NH$_2$; HOOC-PEG-COOH; HS-PEG-SH; H$_2$N-PEG-COOH; HOOC-PEG-SH; H$_2$N-PEG-SH; multi-arm PEG with one or more amino, carboxyl or thiol groups; PEG dendrimers with one or more amino, carboxyl or thiol groups; a diamino-, dicarboxyl-, monoamino- or monocarboxyl-terminated homo- or co-polymer of a non-reactive hydrophilic vinylic monomer; or combinations thereof, wherein PEG is a polyethylene glycol segment, wherein the non-reactive vinylic monomer is selected from the group consisting of acrylamide, methacrylamide, N,N-dimethylacrylamide, N,N-dimethylmethacrylamide, N-vinylpyrrolidone, N,N,-dimethylaminoethylmethacrylate, N,N-dimethylaminoethylacrylate, N,N-dimethylaminopropylmethacrylamide, N,N-dimethylaminopropylacrylamide, glycerol methacrylate, 3-acryloylamino-1-propanol, N-hydroxyethyl acrylamide, N-[tris(hydroxymethyl)methyl]-acrylamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 2-hydroxyethyl (meth)acrylate, hydroxypropyl (meth)acrylate, a phosphorylcholine-containing vinylic monomer, C$_1$-C$_4$-alkoxy polyethylene glycol (meth)acrylate having a weight average molecular weight of up to 1500 Daltons, N-vinyl formamide, N-vinyl acetamide, N-vinyl isopropylamide, N-vinyl-N-methyl acetamide, allyl alcohol, vinyl alcohol (hydrolyzed form of vinyl acetate in the copolymer), and combinations thereof.

13. The method of claim 10, wherein the hydrophilic polymer as the hydrophilicity-enhancing agent is a copolymer which is a polymerization product of a composition comprising (1) about 60% by weight or less from about 1% to about 15%, by weight of at least one reactive vinylic monomer and (2) at least one non-reactive hydrophilic vinylic monomer, wherein the reactive vinylic monomer is selected from the group consisting of amino-C$_1$-C$_6$ alkyl (meth)acrylate, C$_1$-C$_6$ alkylamino-C$_1$-C$_6$ alkyl (meth)acrylate, allylamine, vinylamine, amino-C$_1$-C$_6$ alkyl (meth)acrylamide, C$_1$-C$_6$ alkylamino-C$_1$-C$_6$ alkyl (meth)acrylamide, acrylic acid, C$_1$-C$_4$ alkylacrylic acid, N,N-2-acrylamidoglycolic acid, beta-methyl-acrylic acid, alpha-phenyl acrylic acid, beta-acryloxy propionic acid, sorbic acid, angelic acid, cinnamic acid, 1-carobxy-4-phenyl butadiene-1,3, itaconic acid, citraconic acid, mesaconic acid, glutaconic acid, aconitic acid, maleic acid, fumaric acid, tricarboxy ethylene, and combinations thereof;
  wherein the non-reactive vinylic monomer is selected from the group consisting of acrylamide, methacrylamide, N,N-dimethylacrylamide, N,N-dimethylmethacrylamide, N-vinylpyrrolidone, N,N,-dimethylaminoethylmethacrylate, N,N-dimethylaminoethylacrylate, N,N-dimethylaminopropylmethacrylamide, N,N-dimethylaminopropylacrylamide, glycerol methacrylate, 3-acryloylamino-1-propanol, N-hydroxyethyl acrylamide, N-[tris(hydroxymethyl)methyl]-acrylamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 2-hydroxyethyl (meth)acrylate, hydroxypropyl (meth)acrylate, a phosphorylcholine-containing vinylic monomer, C$_1$-C$_4$-alkoxy polyethylene glycol (meth)acrylate having a weight average molecular weight of up to 1500 Daltons, N-vinyl formamide, N-vinyl acetamide, N-vinyl isopropylamide, N-vinyl-N-methyl acetamide, allyl alcohol, vinyl alcohol (hydrolyzed form of vinyl acetate in the copolymer), and combinations thereof.

14. The method of claim 10, wherein the hydrophilic polymer as the hydrophilicity-enhancing agent is an amino- or carboxyl-containing polysaccharide, hyaluronic acid, chondroitin sulfate, and combinations thereof.

15. The method of claim 10, wherein the weight average molecular weight $M_w$ of the hydrophilicity-enhancing agent is from about 500 to about 1,000,000 Daltons.

16. The method of claim 10, wherein the hydrophilicity-enhancing agent is: amino-, carboxyl- or thiol-containing monosaccharides; amino-, carboxyl- or thiol-containing disaccharides; and amino-, carboxyl- or thiol-containing oligosaccharides.

17. The method of claim 10, wherein the first polymer chains are derived from the polyamidoamine-epichlorohydrin.

18. The method of claim 10, wherein the first polymer chains are derived from the poly(2-oxazoline-co-ethyleneimine)-epichlorohydrin.

19. The method of claim 1, wherein the step of heating is carried out directly in a sealed lens package containing a packaging solution including the water-soluble and thermally-crosslinkable hydrophilic polymeric material during sterilization by autoclave at a temperature from about 115° C. to about 125° C. for at least about 20 minutes under pressure; wherein the packaging solution comprises from about 0.01% to about 2% by weight of the water-soluble and thermally-crosslinkable hydrophilic polymeric material; wherein the packaging solution comprises at least one buffering agent in an amount sufficient to maintain a pH of from about 6.0 to about 8.5 and has a tonicity of from about 200 to about 450 milliosmol (mOsm), and a viscosity of from about 1 centipoise to about 5 centipoises, at 25° C.

20. A silicone hydrogel contact lens, comprising:
 a silicone hydrogel substrate;
 a base coating on the surface of the silicone hydrogel substrate, wherein the base coating comprises a prime plasma layer and a reactive polymer layer on top of the prime plasma layer, wherein the plasma prime layer has a thickness of from about 0.5 nm to about 40 nm, wherein the reactive polymer comprises reactive functional groups selected from the group consisting of carboxyl groups, primary amino groups, secondary amino groups, and combinations thereof; and
 a non-silicone hydrogel coating covalently attached onto the base coating, wherein the non-silicone hydrogel coating is covalently attached onto the reactive polymer layer through multiple reactive functional groups,
 wherein the silicone hydrogel contact lens in a fully-hydrated state has an oxygen permeability of at least about 40 barrers, a WBUT of at least about 10 seconds, a friction rating of about 3 or lower, and a water contact angle of about 80 degrees or less.

* * * * *